United States Patent [19]
Brooks

[11] Patent Number: 6,008,809
[45] Date of Patent: Dec. 28, 1999

[54] APPARATUS AND METHOD FOR VIEWING MULTIPLE WINDOWS WITHIN A DYNAMIC WINDOW

[75] Inventor: Arthur P. Brooks, Oronoco, Minn.

[73] Assignee: International Business Machines Corporation, Armonk, N.Y.

[21] Appl. No.: 08/935,174

[22] Filed: Sep. 22, 1997

[51] Int. Cl.[6] ................................................... G06F 15/00
[52] U.S. Cl. ............................................ 345/342; 345/344
[58] Field of Search .................................... 345/333, 339, 345/340, 342, 343, 842

[56] References Cited

U.S. PATENT DOCUMENTS

| | | | |
|---|---|---|---|
| 5,561,757 | 10/1996 | Southgate | 345/342 |
| 5,712,995 | 1/1998 | Cohn | 345/342 |
| 5,819,055 | 10/1998 | MacLean et al. | 345/342 |
| 5,838,318 | 11/1998 | Porter et al. | 345/342 |

OTHER PUBLICATIONS

"Working with Docking Tool Windows", VC++ 4.2: VC++ User's Guide, P. 1–5 (Microsoft Corporation 1996).

*Primary Examiner*—Ba Huynh
*Attorney, Agent, or Firm*—Derek P. Martin; Martin & Associates, LLC

[57] ABSTRACT

An apparatus and method for viewing multiple windows simultaneously within a dynamic window allows a user to relate several windows shown on a display without having to repeatedly arrange and size each individual window. In the preferred embodiment, once a window is selected and dragged into the dynamic window, the dynamic windowing mechanism dynamically sizes the window. Dynamic sizing causes the window to be sized in proportion to other windows already located within the dynamic window. For example, if the dynamic window is empty and a new window is dragged and dropped into the dynamic window, the new window will occupy the entire dynamic window; if the dynamic window contains two windows and a third window is dragged and dropped into the dynamic window, each window will occupy a portion of the dynamic window. The process of selecting and dragging windows into the dynamic window is repeated until all desired windows are displayed within the dynamic window. As windows are dropped into the dynamic window, horizontal and vertical boundary lines are created to separate windows. The size of the windows within the dynamic window can be altered by manipulating the horizontal and vertical boundaries. If a window within the dynamic window becomes too small, it is replaced by a button that shows the title of the window. The dynamic window allows multiple windows to be viewed on the same level (i.e., without overlap), without the time consuming process of having to repeatedly resize and position multiple windows.

30 Claims, 20 Drawing Sheets

APPARATUS AND METHOD FOR VIEWING MULTIPLE WINDOWS WITHIN A DYNAMIC WINDOW

BACKGROUND OF THE INVENTION

1. Technical Field

This invention generally relates to computer graphical user interfaces, such as Windows. More specifically, this invention relates to an apparatus and method for viewing multiple windows within a dynamic window.

2. Background Art

The development of the EDVAC computer system of 1948 is often cited as the beginning of the computer era. Since that time, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

With the introduction of the personal computer (PC), computers moved from the office into the home. At first, lay people were expected to use the same difficult computing environments as computer programmers and engineers. Soon the computer industry realized that if more computers were to be sold, computers would have to become easier to operate by those not so well versed with computers. In turn, graphical user interfaces (GUIs) were developed which allowed users to perform a command by simply pointing with the mouse and clicking on a picture called an icon. This point and click method eliminated the time consuming need to manually type in long and unfriendly commands.

A window is part of the GUI which can be viewed as a display area for a portion of something that is displayed to the user. A single window may fill the entire display, or multiple windows may be present on the display at the same time. When multiple windows are displayed simultaneously, they may be independently displayed at the same time or may be partially or completely overlapping. Windows can be adjusted to any size within screen limits, and can be placed in any location on the screen by the user using a suitable pointing device (such as a mouse). Changing the location of the windows may cause some windows to overlap one another or even completely cover one another depending on size.

The user may wish to view several windows simultaneously. In order to arrange the windows so that they can be viewed simultaneously, the user must manipulate the size and position of the windows which is a time consuming and cumbersome process. In the known prior art, some attempts have been made to relate windows to each other for more convenient display. For example, the Microsoft Visual C++ Developer's Studio provides the capability of tiling and docking windows. Tiling windows means that multiple windows are placed within a rectangular area so that the windows are automatically sized to take up the full area. Tiling may be either horizontal or vertical, i.e., given a rectangular area N rows by M columns, tiled into three windows, each may be N rows by M/3 columns, or may be N/3 rows by M columns. Tiling in this context refers to the initial placement of windows in an area. Once placed, the windows may function independently of each other, just like any other window.

While the tiling capability explained above is useful, it still does not give a user enough control of how windows are displayed. Without a method for relating windows so they can be automatically sized, positioned and displayed with respect to each other, computer users will have to manually size, resize, position, and reposition windows to obtain a desired display arrangement of windows on a computer display.

DISCLOSURE OF INVENTION

According to the present invention, an apparatus and method for viewing multiple windows simultaneously within a dynamic window is provided. The dynamic window may be seen as a tool which allows a user to relate several application windows shown on a display without having to repeatedly arrange and size each individual window. Each application window dragged into the dynamic window can be created using any application program and the resulting dynamic window may contain windows created from several application programs.

In the preferred embodiment, once an application window is selected and dragged into the dynamic window, the dynamic windowing mechanism dynamically sizes the window. Dynamic sizing causes the window to be sized in proportion to other windows already located within the dynamic window. For example, if the dynamic window is empty and a new window is dragged and dropped into the dynamic window, the new window will occupy the entire dynamic window; if the dynamic window contains two windows and a third window is dragged and dropped into the dynamic window, each window will occupy a portion of the dynamic window.

The process of selecting and dragging windows into the dynamic window is repeated until all desired windows are displayed within the dynamic window. The dragging and selection process allows the user to relate windows in some way. As windows are dropped into the dynamic window, horizontal and vertical boundary lines are created to separate windows. The size of the windows within the dynamic window can be altered by manipulating the horizontal and vertical boundaries. The dynamic window is transparent to other applications so that the applications do not know when the user has related the independent windows in this way. The dynamic window allows multiple windows to be viewed on the same level, without the time consuming process of having to resize and position multiple windows.

The foregoing and other objects, features and advantages of the invention will be apparent from the following more particular description of the preferred embodiment, as illustrated in the accompanying drawings.

BEST MODE FOR CARRYING OUT THE INVENTION

According to the present invention, an apparatus and method for viewing multiple windows within a dynamic window is provided which allows multiple windows to be dragged and dropped into a single dynamic window which dynamically sizes the windows, thereby eliminating the time consuming and cumbersome process of manually moving and resizing multiple windows for simultaneous viewing.

Figure 1:
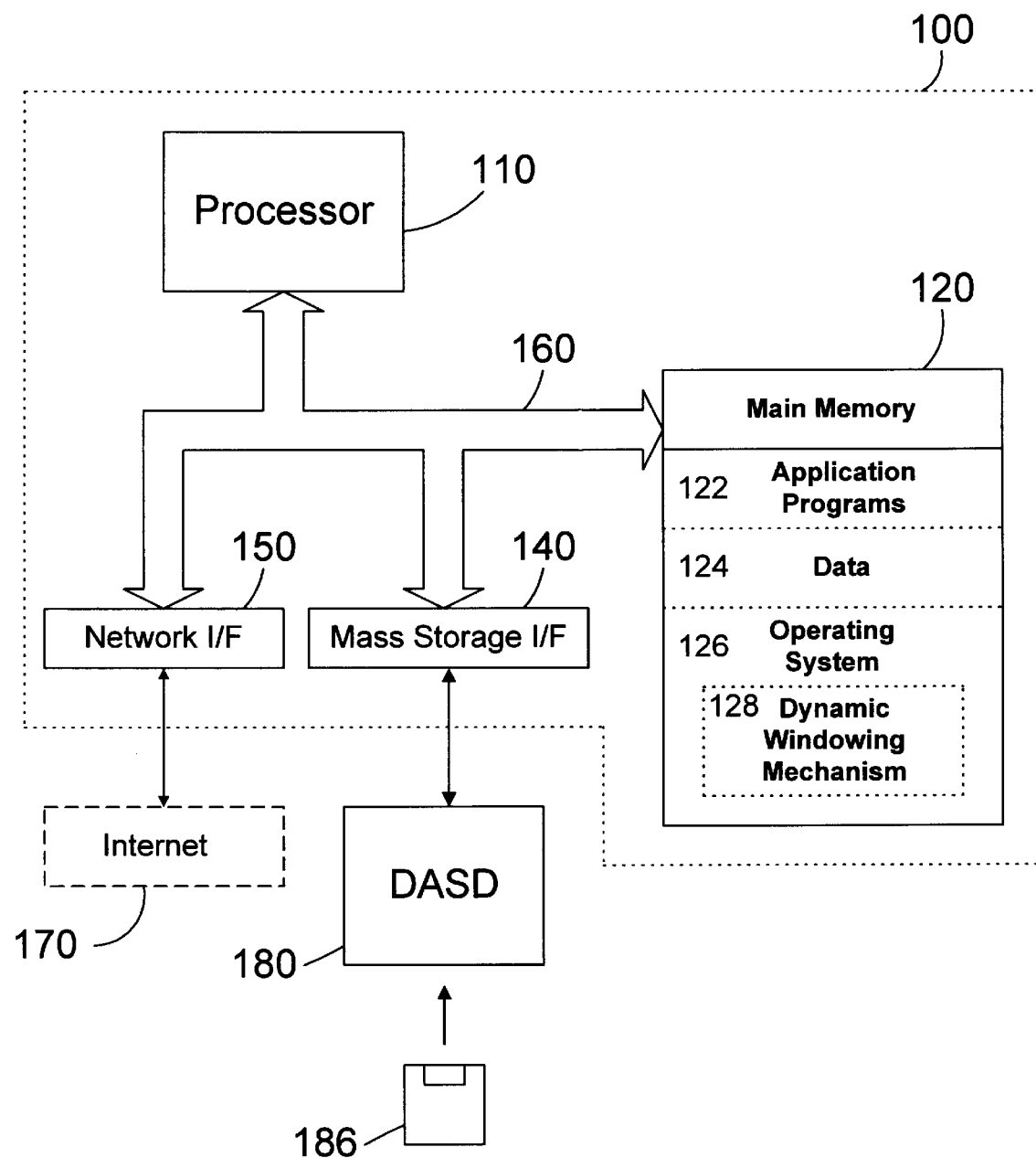
FIG. 1 is a block diagram of a computer system in accordance with the present invention.

Referring to FIG. 1, a computer system 100 in accordance with the present invention includes a processor 110, a main memory 120, a mass storage interface 140, and a network interface 150, all connected by a system bus 160. Those skilled in the art will appreciate that this system encompasses all types of computer systems: personal computers, midrange computers, mainframes, etc. Note that many additions, modifications, and deletions can be made to this computer system 100 within the scope of the invention. Examples of possible additions include: a computer monitor, a keyboard, a cache memory, and peripheral devices such as printers.

Processor 110 can be constructed from one or more microprocessors and/or integrated circuits. Processor 110 executes program instructions stored in main memory 120. Main memory 120 stores programs and data that the computer may access. When computer system 100 starts up, processor 110 initially executes the program instructions that make up operating system 126. Operating system 126 is a sophisticated program that manages the resources of the computer system 100. Some of these resources are the processor 110, main memory 120, mass storage interface 140, network interface 150, and system bus 160.

Main memory 120 includes one or more application programs 122, data 124, operating system 126, and a dynamic windowing mechanism 128. Application programs 122 are executed by processor 110 under the control of operating system 126. Application programs 122 can be run with program data 124 as input. Application programs 122 can also output their results as program data 124 in main memory. In the present invention, a computer system 100 includes a dynamic windowing mechanism 128 that allows multiple windows to be automatically manipulated and displayed within a dynamic window on a computer display. Note that FIG. 1 shows that dynamic windowing mechanism 128 is a part of operating system 126 in accordance with the preferred embodiment. However, it is equally within the scope of the present invention to provide a separate software application or utility that could also provide dynamic windowing mechanism 128 separate from operating system 126.

Mass storage interface 140 allows computer system 100 to retrieve and store data from auxiliary storage devices such as magnetic disks (hard disks, diskettes) and optical disks (CD-ROM). These mass storage devices are commonly known as Direct Access Storage Devices (DASD), and act as a permanent store of information. One suitable type of DASD is a floppy disk drive 180 that reads data from and writes data to a floppy diskette 186. The information from the DASD can be in many forms. Common forms are application programs and program data. Data retrieved through mass storage interface 140 is usually placed in main memory 120 where processor 110 can process it.

While main memory 120 and DASD device 180 are typically separate storage devices, computer system 100 uses well known virtual addressing mechanisms that allow the programs of computer system 100 to behave as if they only have access to a large, single storage entity, instead of access to multiple, smaller storage entities (e.g., main memory 120 and DASD device 180). Therefore, while certain elements are shown to reside in main memory 120, those skilled in the art will recognize that these are not necessarily all completely contained in main memory 120 at the same time. It should be noted that the term "memory" is used herein to generically refer to the entire virtual memory of computer system 100. In addition, an apparatus in accordance with the present invention includes any possible configuration of hardware and software that contains the elements of the invention, whether the apparatus is a single computer system or is comprised of multiple computer systems operating in concert.

Network interface 150 allows computer system 100 to send and receive data to and from any network the computer system may be connected to. This network may be a local area network (LAN), a wide area network (WAN), or more specifically the Internet 170. Suitable methods of connecting to a network include known analog and/or digital techniques, as well as networking mechanisms that are developed in the future. Many different network protocols can be used to implement a network. These protocols are specialized computer programs that allow computers to communicate across a network. TCP/IP (Transmission Control Protocol/Internet Protocol), used to communicate across the Internet, is an example of a suitable network protocol.

System bus 160 allows data to be transferred among the various components of computer system 100. Although computer system 100 is shown to contain only a single main processor and a single system bus, those skilled in the art will appreciate that the present invention may be practiced using a computer system that has multiple processors and/or multiple buses. In addition, the interfaces that are used in the preferred embodiment may include separate, fully programmed microprocessors that are used to off-load compute-intensive processing from processor 110, or may include I/O adapters to perform similar functions.

At this point, it is important to note that while the present invention has been (and will continue to be) described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 186 of FIG. 1) and CD ROM, and transmission type media such as digital and analog communications links.

The remainder of this specification describes how the present invention improves the convenience of viewing multiple windows simultaneously on a computer display by providing a dynamic window that a user may use to hold and automatically manipulate multiple windows. Those skilled in the art will appreciate that the present invention applies equally to any type of computer window generated from any type of computer program, including applications and system programs.

Figure 2:
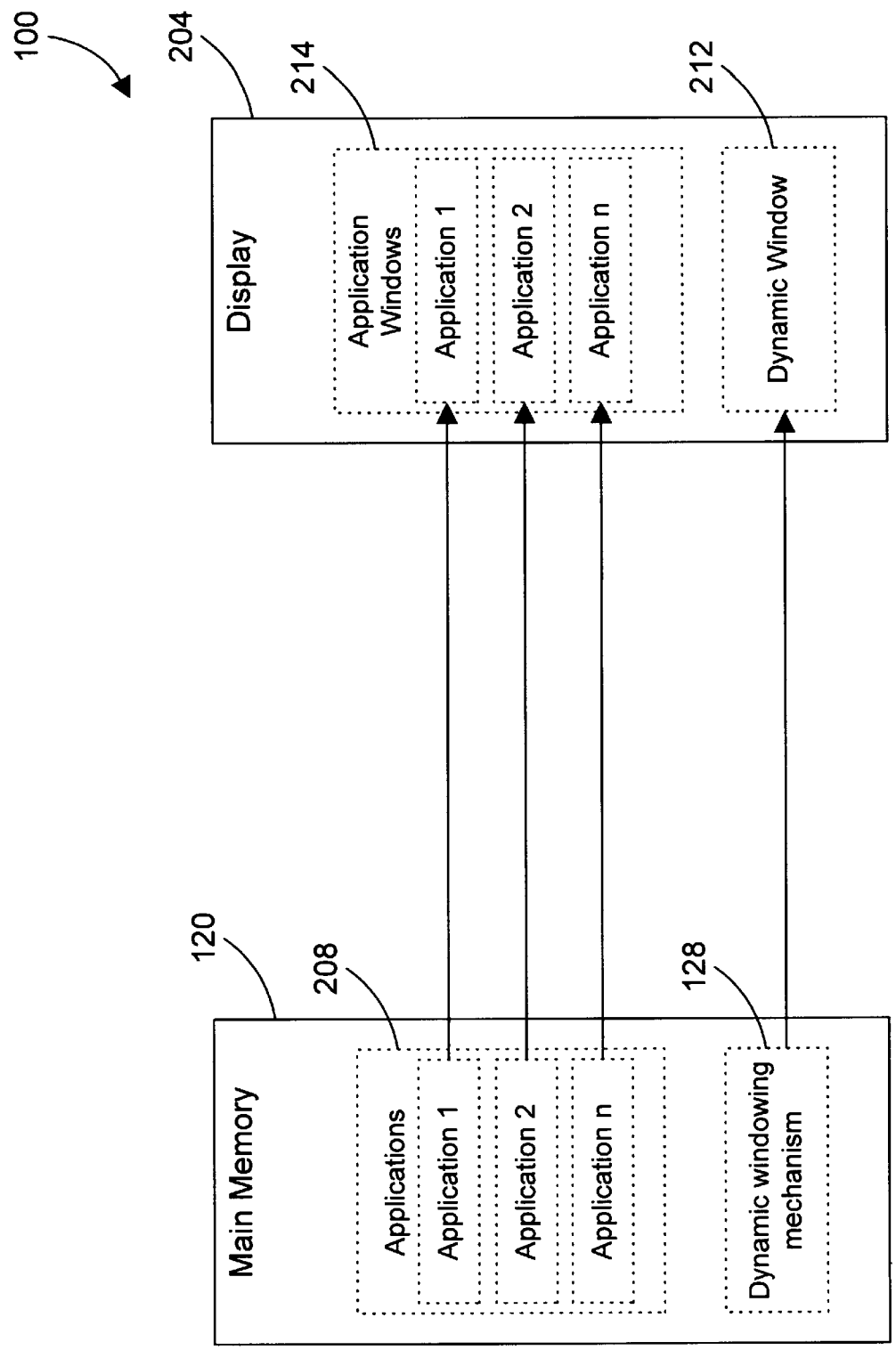
FIG. 2 is a block diagram of a computer system that allows multiple windows to be viewed simultaneously within a dynamic window.

Referring to FIG. 2, apparatus 100 of FIG. 1 is shown to further include a display 204. For the sake of clarity, FIG. 2 shows main memory 120 directly coupled to display 204, recognizing that there may be intervening circuitry or operations between the information in main memory 120 and display 204. Main memory 120 includes applications 208 and dynamic windowing mechanism 128. Any number of applications may be running and stored in main memory 120 for use with dynamic windowing mechanism 128. The dynamic windowing mechanism 128 is a tool that allows simultaneous viewing of application windows that may be generated from one or more applications. The dynamic windowing mechanism is executed when a user invokes a dynamic window 212 in order to view multiple application windows simultaneously on the same level, i.e., without overlapping one another.

Display 204 includes multiple application windows 214 and a dynamic window 212. Application windows 214 on display 204 are created by the corresponding applications 208 (e.g., application 1, application 2 . . . application n) running in main memory 120. Initially, as shown in FIG. 2, dynamic window 212 is empty and application windows 214 from the applications running in main memory 120 are shown elsewhere on display 204.

Figure 3:
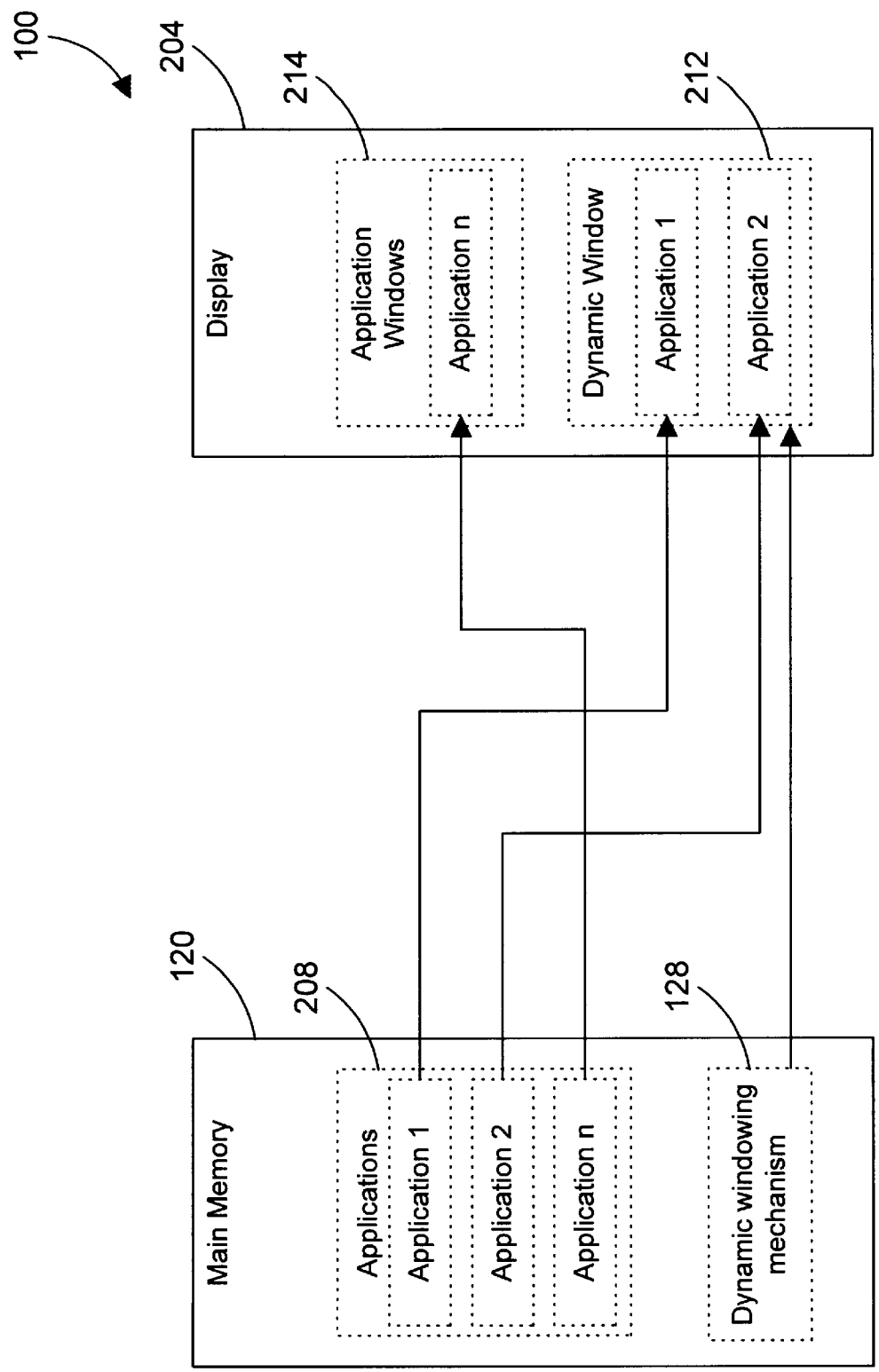
FIG. 3 is a block diagram of a computer system that depicts the use of the dynamic window displaying multiple windows simultaneously.

Now referring to FIG. 3, application window 1 and application window 2 are shown to reside within dynamic window 212 and other application windows (e.g., for application n) reside on the display outside of the dynamic window 212. The user can relate application windows shown on the display by dragging and dropping the application windows 214 into dynamic window 212. Application windows 214 dragged into dynamic window 212 may all be created using the same application or several different applications. Dynamic window 212 automatically sizes the application windows 214 that have been dragged and dropped into dynamic window 212. The user can then adjust the size of each individual application window.

In the alternative, one or more application windows 214 may be selected (i.e., related together) before dynamic window 212 is created. When the user requests that dynamic window 212 be created, the selected windows are then automatically placed within dynamic window 212. The present invention extends to any mechanism or method for selecting windows and placing windows within a dynamic window 212, regardless of the order of creating the windows and the dynamic window 212 and regardless of the specific mechanism for selecting or relating the windows.

Figure 4:
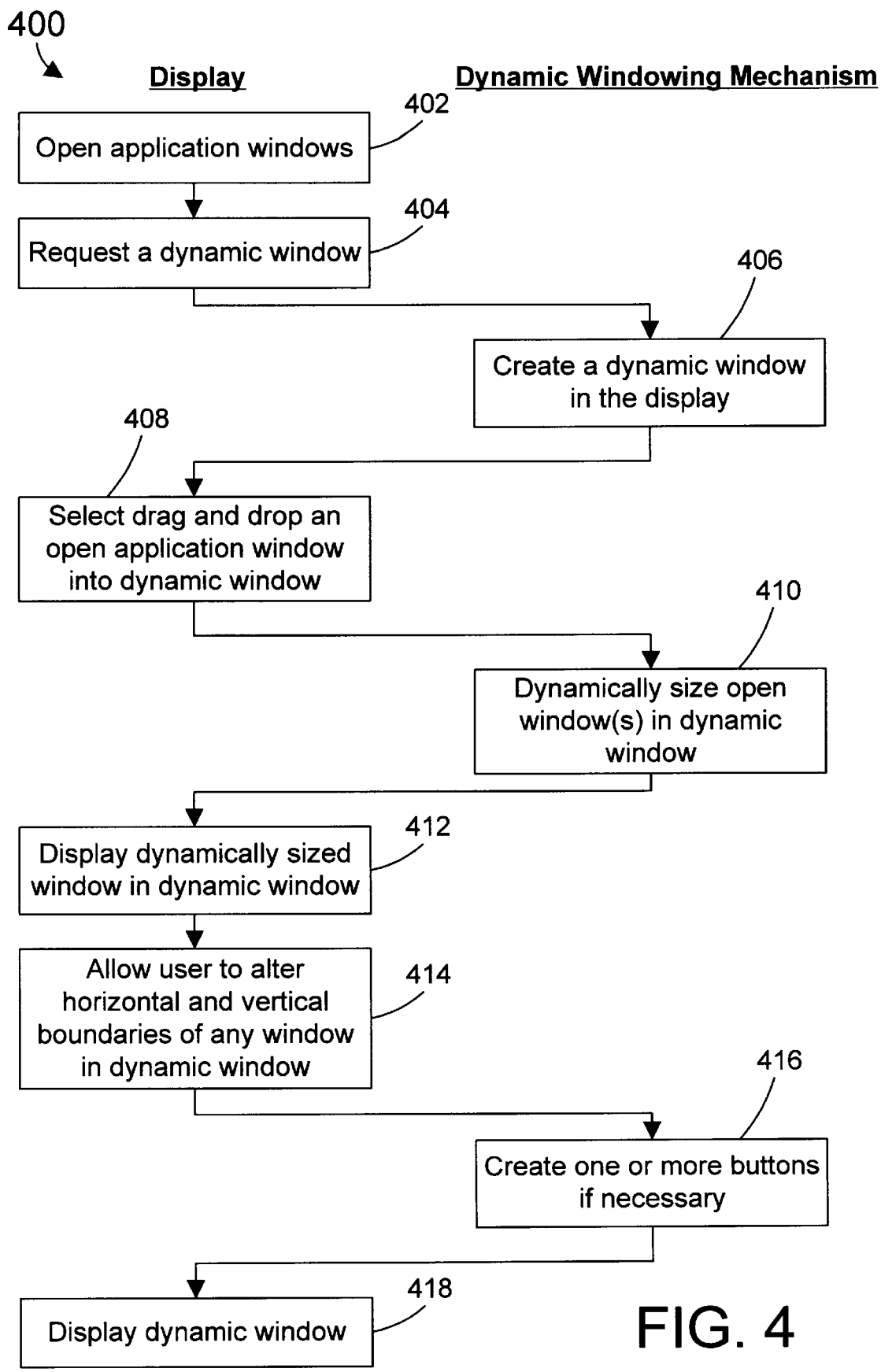
FIG. 4 is a flow diagram of the method steps for viewing multiple windows simultaneously within a dynamic window.

Referring now to FIG. 4, the function of dynamic window 212 is best described with reference to a method 400 in accordance with the preferred embodiment, where display 204 displays and performs the steps in the left column and where dynamic windowing mechanism 128 performs the steps in the right column. Method 400 starts by the user opening multiple application windows (step 402). The application windows may be from any suitable software application. Once several application windows are shown on the display, the user may wish to view some of the windows simultaneously. The user may then request a dynamic window (step 404), which may be used to simultaneously view multiple windows without having to repeatedly position and size each application window. In response to the user's request for the dynamic window, dynamic windowing mechanism 128 creates the dynamic window for the display (step 406). The user may then select, drag and drop one or more application windows into the dynamic window until all desired application windows are located within the dynamic window (step 408).

Dynamic windowing mechanism 128 dynamically sizes each application window as it is dragged and dropped into the dynamic window (step 410). Dynamic sizing causes the application window to be sized in relation to other application windows residing in the dynamic window. For example, if the dynamic window is empty and one application window is dragged and dropped into the dynamic window, the application window will occupy the entire dynamic window; if the dynamic window contains two application windows and a third application window is dragged and dropped in, each application window will occupy a portion of the dynamic window.

Also during dynamic sizing, dynamic windowing mechanism 128 may create horizontal and vertical splitters as needed which separate application windows located within dynamic window 212. Dynamic window 212 has a top boundary, a bottom boundary, a left boundary and a right boundary. In the preferred embodiment, the type of splitter created depends on which boundary of the application window crosses as it is dragged into dynamic window 212. For example, if the application window crosses the top or bottom boundary of the dynamic window, a horizontal splitter is created. Conversely, if the application window crosses the left or right boundary of the dynamic window, a vertical splitter is created.

Once the application window is dynamically sized, the display is updated to show the dynamically sized application window(s) residing in the dynamic window (step 412). As mentioned above, the process of dragging application windows into the dynamic window (step 408) is repeated until all desired application windows are located within the dynamic window. As each application window is dropped into the dynamic window, it is dynamically sized in step 410 and the display is updated to show each addition to the dynamic window.

Once one or more application windows have been dropped into the dynamic window, the user may alter the size of one or more application windows residing within the dynamic window (step 414). The size of the application windows may be altered by adjusting the horizontal and vertical splitters that were created during dynamic sizing. In the preferred embodiment, two methods are used to adjust the splitters: In the first method, the user can adjust size of the application windows by individually selecting and dragging the horizontal and/or vertical boundaries. In the second method, the user can adjust the size of the application windows by selecting and dragging the intersection points of the horizontal and vertical boundaries. This causes the horizontal and vertical splitters to be adjusted simultaneously, thereby eliminating the need to adjust each splitter individually.

If the horizontal/vertical splitter is dragged within a predetermined distance from the border of the dynamic window, causing one or more of the application windows to become too small to view its contents, the dynamic windowing mechanism creates a button to represent the affected application windows (step 416). If the button is created through adjustment of the horizontal boundary, the button is created with the window title reading left to right. Conversely, if the button is created through adjustment of the vertical boundary, the button is created with the window title reading up and down. The application window is returned to its previous size and location in the dynamic window by the dynamic windowing mechanism when the user presses the button representing the application window. Alternatively, the user can drag the adjacent splitter to resize the window to some other size instead. The dynamic window is then displayed to the user (step 418).

Figure 5:
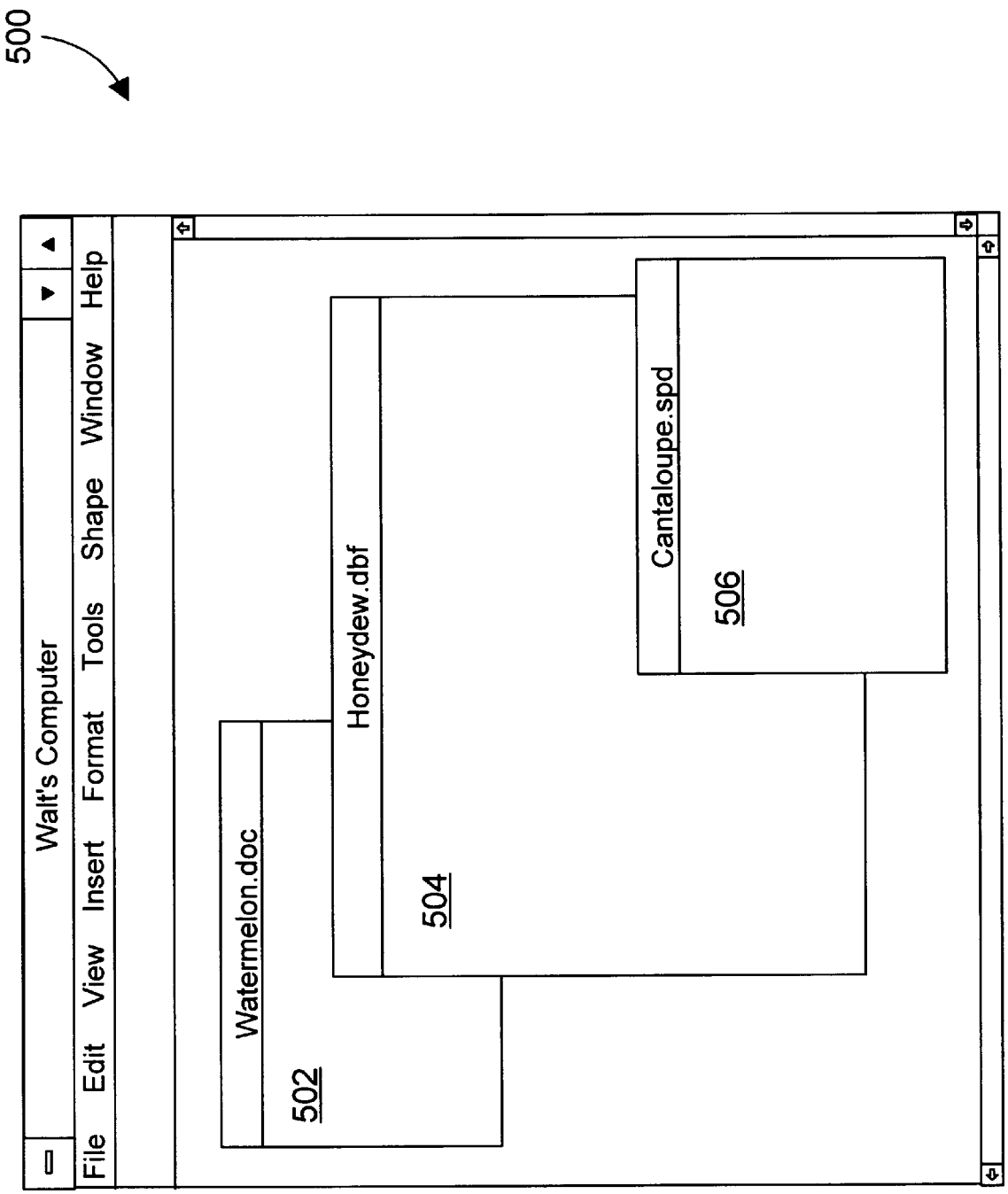
FIG. 5 is a sample display depicting the display before the introduction of the dynamic window.

The function of the preferred embodiment disclosed herein may best be understood from the user's viewpoint as shown in FIGS. 5 through 20. A sample screen 500 includes three application windows 502, 504 and 506. To demonstrate the diversity of the dynamic window, we assume that each application window has been created using a different application: watermelon.doc 502 in a word processor; honeydew.dbf 504, in a database application, and cantaloupe.spd 506, in a spreadsheet program. Of course, multiple windows on display 500 could be generated from the same application as well. Note that any suitable number of application windows may be shown on the display (subject, of course, to the windows being of usable size). Three application windows are shown in FIGS. 5–20 for the sake of clarity. The display 500 in FIG. 5 shows that the honeydew.dbf window 504, is partially obscured by the cantaloupe.spd window 506, and that the watermelon.doc window 502, is partially obscured by the honeydew.dbf window 504. Using prior art techniques, manual manipulation and sizing of the three application windows by a user would be required in order to view the application windows simultaneously.

Figure 6:
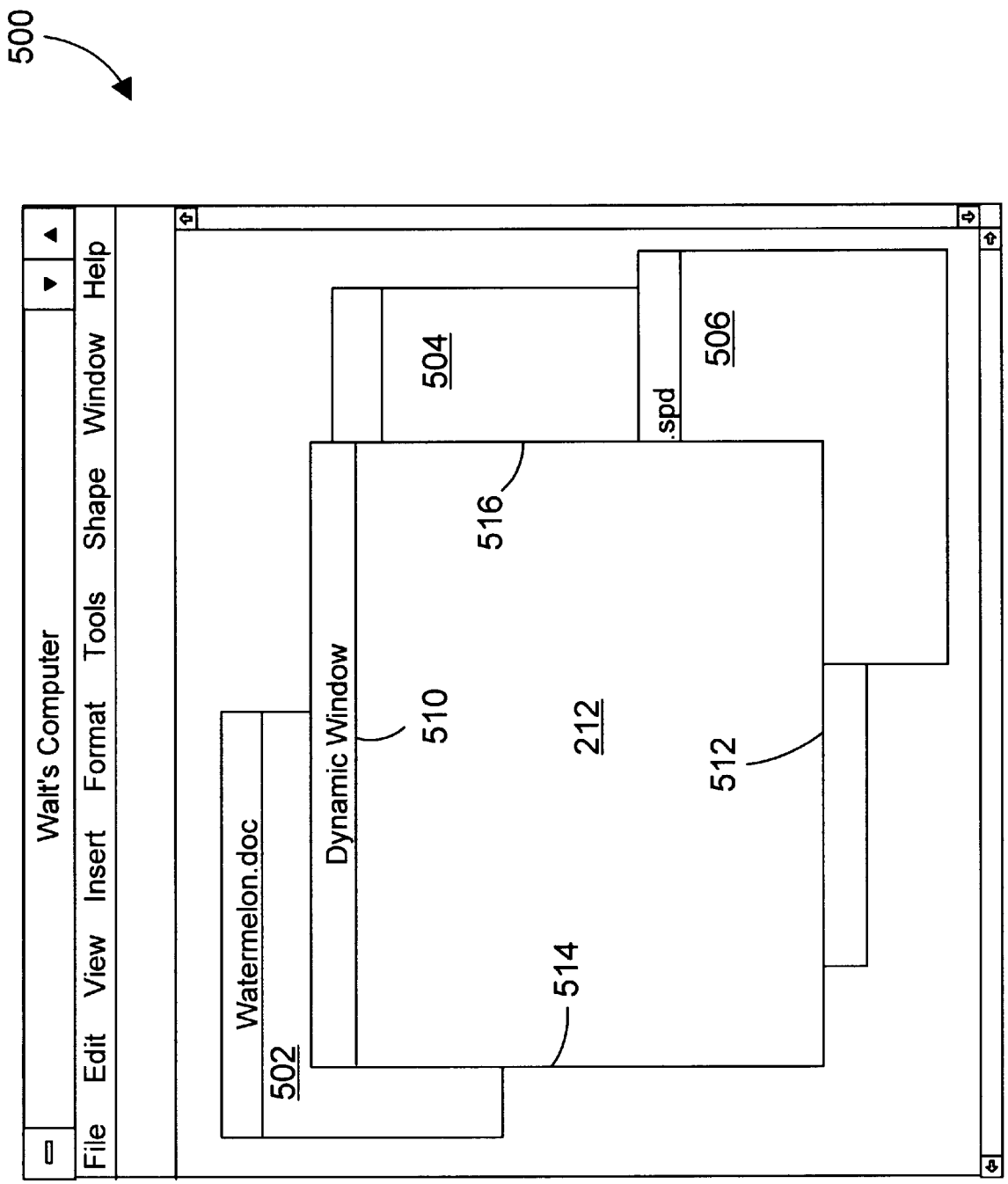
FIG. 6 is the sample display depicting the display after the introduction of the dynamic window.

Now referring to FIG. 6, display 500 now includes a dynamic window 212, which has a top boundary 510, a bottom boundary 512, a left boundary 514 and a right boundary 516. The user invokes dynamic window 212 by requesting a dynamic window from the operating system (step 404 of FIG. 4). Dynamic window 212 allows the user to simultaneously view on the same level the plurality of application windows shown on display 500 without having to manually resize and reposition each application window. When invoked, dynamic window 212 is empty and may obscure application windows shown on the display. In FIG. 6, dynamic window 212 partially obscures all application windows, 502, 504 and 506. In order to simultaneously view any of the application windows shown on the display without having to resize and adjust each individual application window, the user must select, drag and drop the desired windows into dynamic window 212.

Another method (not shown in the figures) for displaying windows within dynamic window 212 is to first select some windows on the display, then create a dynamic window 212 and place the selected windows into the newly created dynamic window 212. Using this method, a user may relate windows together in a dynamic window 212 without manually dragging and dropping the windows into dynamic window 212. Using this method with the example in the FIGS., the user would select the watermelon.doc window 502, the honeydew.dbf window 504, and the cantaloupe.spd window 506 before creating dynamic window 212, so that the creation of dynamic window 212 would place these selected windows within the dynamic window 212, possibly in the arrangement shown in FIG. 12.

Figure 7:
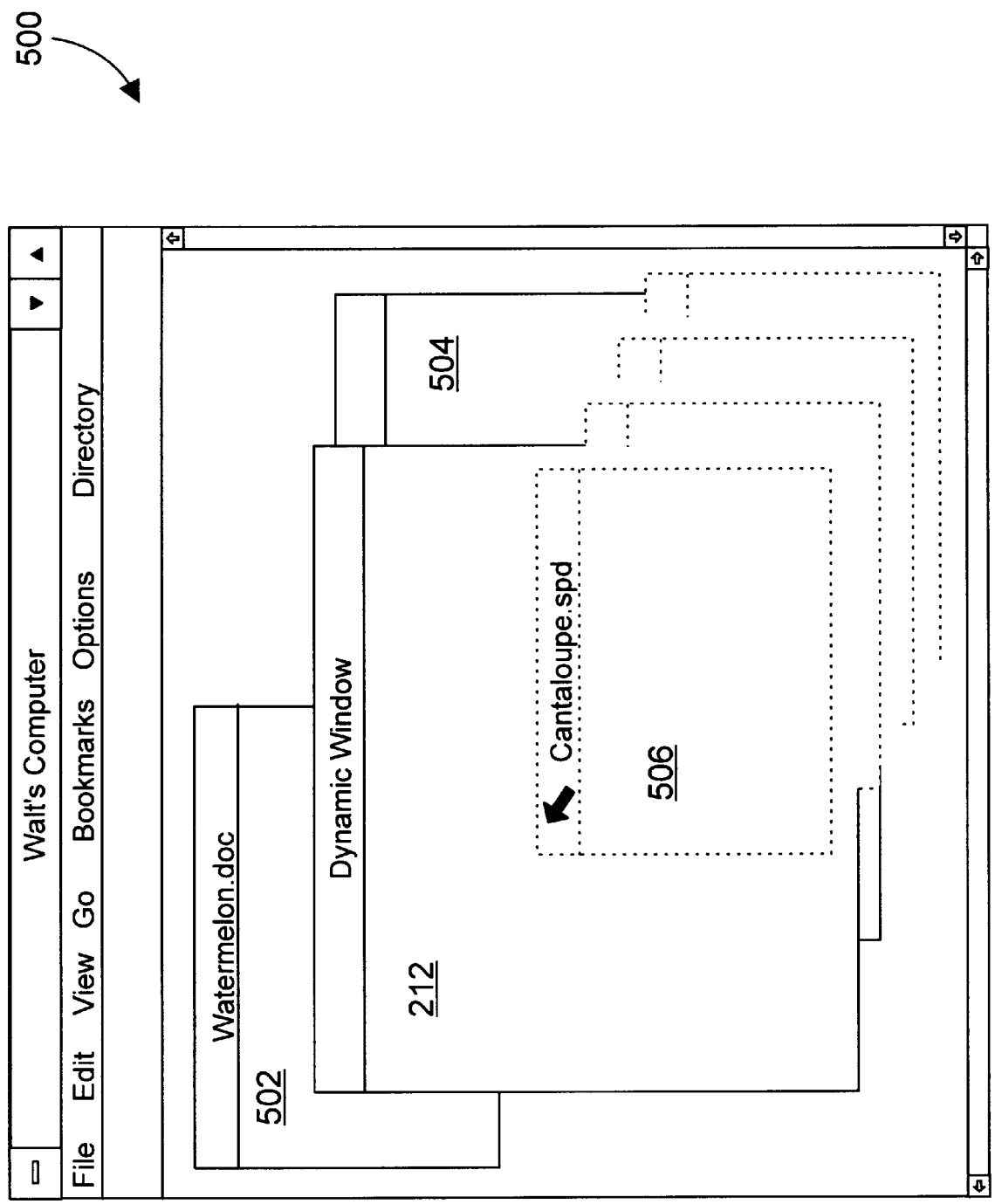
FIG. 7 depicts the display as the cantaloupe.spd window is moved into the dynamic window.

As shown in FIG. 7, the user may drag an application window by first selecting the application window using any suitable method, but the method shown for illustrative purposes in FIGS. 7–12 uses the title bar (i.e., the top portion of the window) for selection. Pressing the mouse button while the cursor is positioned over the title bar of the window causes the window to be selected, allowing the window to be dragged to the desired position. In FIG. 7, the cantaloupe.spd window 506, has been selected and is being dragged into dynamic window 212. The path of the cantaloupe.spd window 506, as it has been selected and is being dragged is shown in phantom and may be described as an upward diagonal path. The user may then place the cantaloupe.spd window 506 into dynamic window 212 by releasing the mouse button when window 506 is on top of dynamic window 212.

Figure 8:
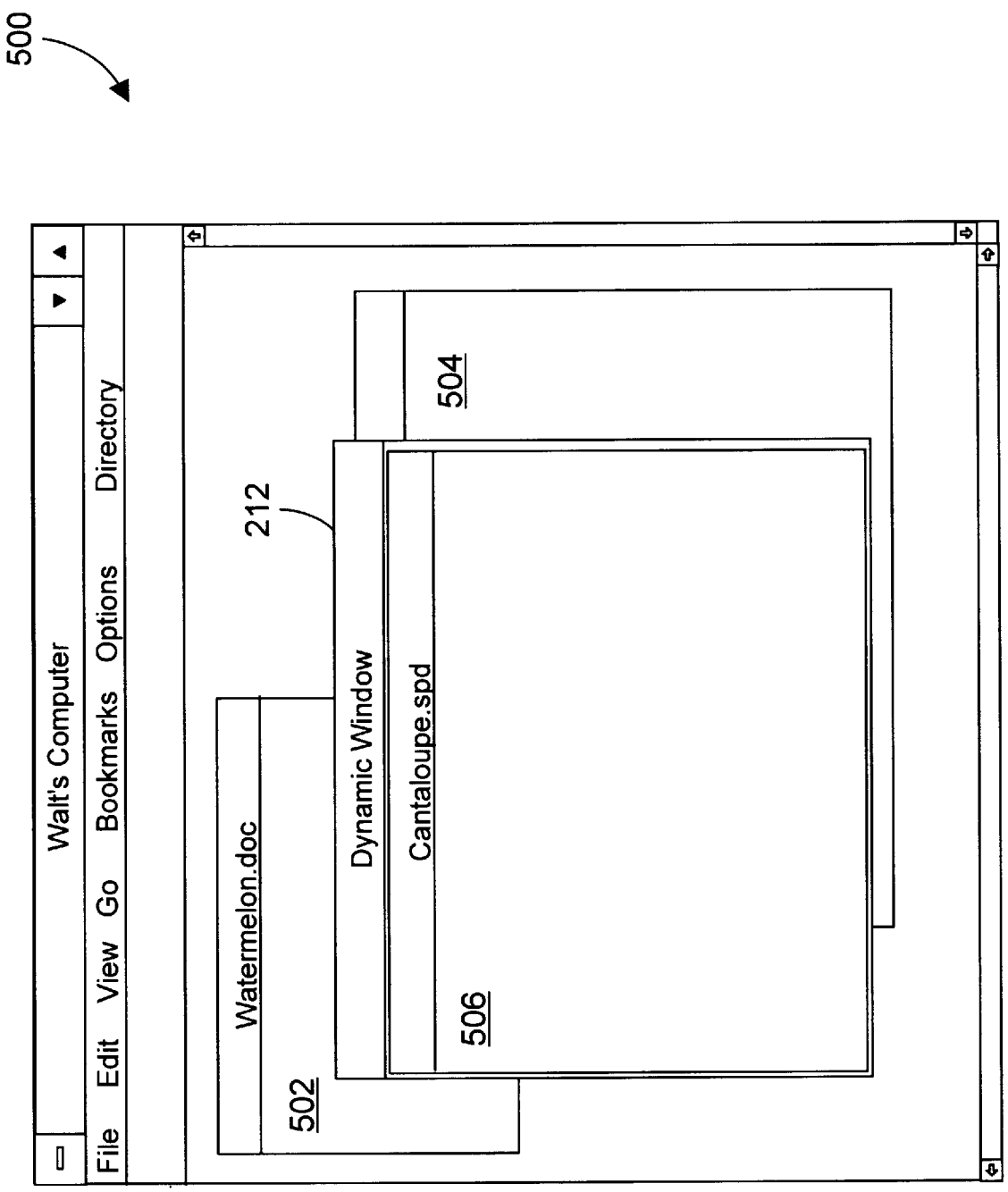
FIG. 8 shows the cantaloupe.spd window after it has been dynamically sized by the dynamic window.

As shown in FIG. 8, the cantaloupe.spd window 506 has been dropped into dynamic window 212. In the preferred embodiment, the cantaloupe.spd window 506 occupies the entire dynamic window 212 since all windows dropped into dynamic window 212 are dynamically sized in proportion to application windows already located in dynamic window 212. Since dynamic window 212 was initially empty, as shown in FIG. 6, the cantaloupe.spd window 506 occupies the entire dynamic window 212 because it is the only application window in dynamic window 212.

Figure 9:
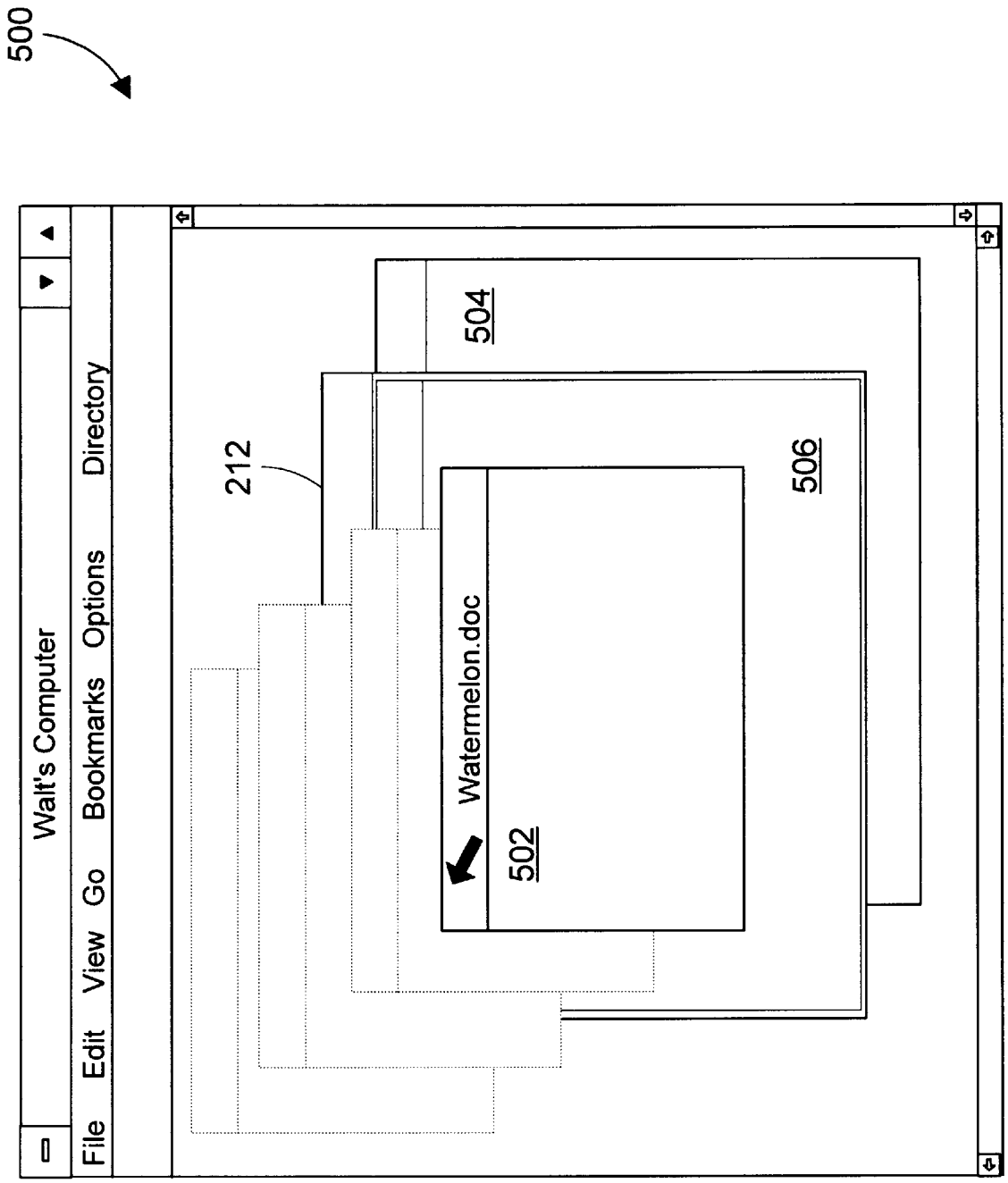
FIG. 9 depicts the display as the watermelon.doc window is moved across the top boundary of the dynamic window.

FIG. 9 shows the watermelon.doc window 502 as it has been selected and is being dragged into dynamic window 212 (which already contains the cantaloupe.spd window 506). The path of the watermelon.doc window 502 as it is being dragged into dynamic window 212 is shown in phantom and may be described as a generally downward diagonal path. The initial location of the watermelon.doc window 502 above dynamic window 212 to the left and the downward diagonal dragging path causes the watermelon.doc window 502 to be dragged over the top boundary of dynamic window 212. Appropriate visual feedback to the user (such as highlighting the boundary of dynamic window 212) is used to indicate to the user which boundary is being crossed.

Figure 10:
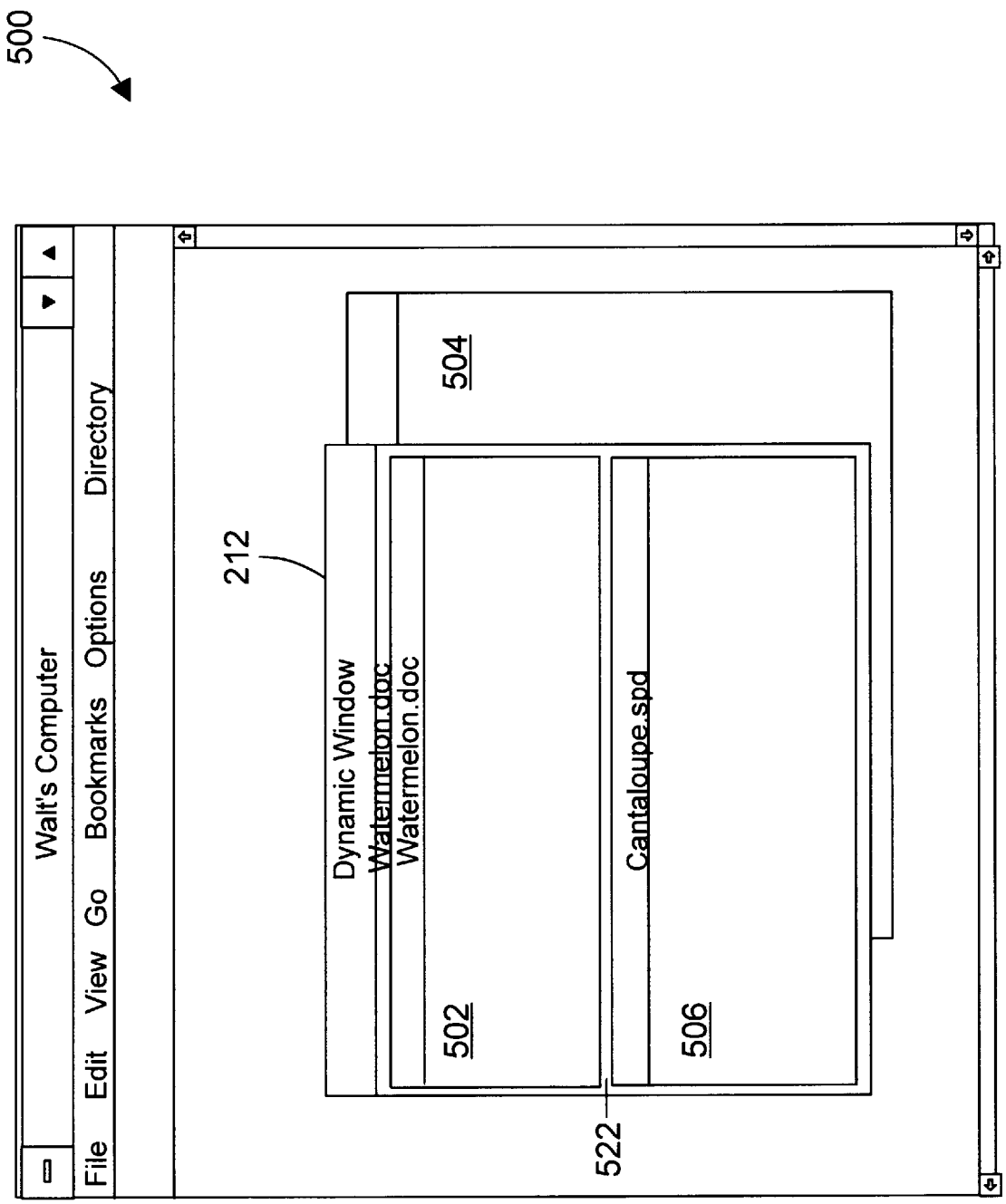
FIG. 10 shows the dynamic window after the watermelon.doc window has been sized dynamically in proportion to the cantaloupe.spd window.

As shown in FIG. 10, the watermelon.doc window 502 and the cantaloupe.spd window 506 are now displayed within dynamic window 212. As mentioned previously, when an application window is dropped into dynamic window 212, dynamic windowing mechanism 128 causes the application window to be dynamically sized in proportion to all other application windows located within dynamic window 212. As shown in FIG. 8, the cantaloupe.spd window 506 existed in dynamic window 212 when the watermelon.doc window 502 was dropped into dynamic window 212. As a result of dynamic sizing, the watermelon.doc window 502 is sized in proportion to the cantaloupe.spd window 506 and each window 502 and 506 occupies one half of dynamic window 212.

FIG. 10 also shows a horizontal splitter 522 located between the watermelon.doc window 502 and the cantaloupe.spd window 506. During the dynamic sizing process, dynamic windowing mechanism 128 creates a splitter which separates the application window just dropped into dynamic window 212 from application windows already residing within dynamic window 212. In FIG. 10, the cantaloupe.spd window 506 resided within dynamic window 212 when the watermelon.doc window 502 was dropped into dynamic window 212. Dynamic windowing mechanism 128 created horizontal splitter 522 in order to separate the watermelon.doc window 502 and the cantaloupe.spd window 506.

The orientation of the splitter, either horizontal or vertical, depends upon which dynamic window boundary the title bar of the application window crosses as it is being dragged into dynamic window 212. For example, dynamic windowing mechanism 128 checks to see if the title bar of the application window crossed the top, bottom, left or right dynamic window boundary. If the title bar crosses the top or bottom dynamic window boundary, dynamic windowing mechanism 128 creates a horizontal splitter between the new application window and existing windows in dynamic window 212. Conversely, if the title bar crosses the left or right dynamic window boundary, dynamic windowing mechanism 128 creates a vertical splitter. Here, dragging the watermelon.doc window 502 into dynamic window 212 caused the title bar of the watermelon.doc window 502 to cross the top boundary of dynamic window 212, causing the horizontal splitter 522 to be created between the watermelon.doc window 502 and the cantaloupe.spd window 506, with the watermelon.doc window 502 located above the cantaloupe.spd window 506.

Figure 11:
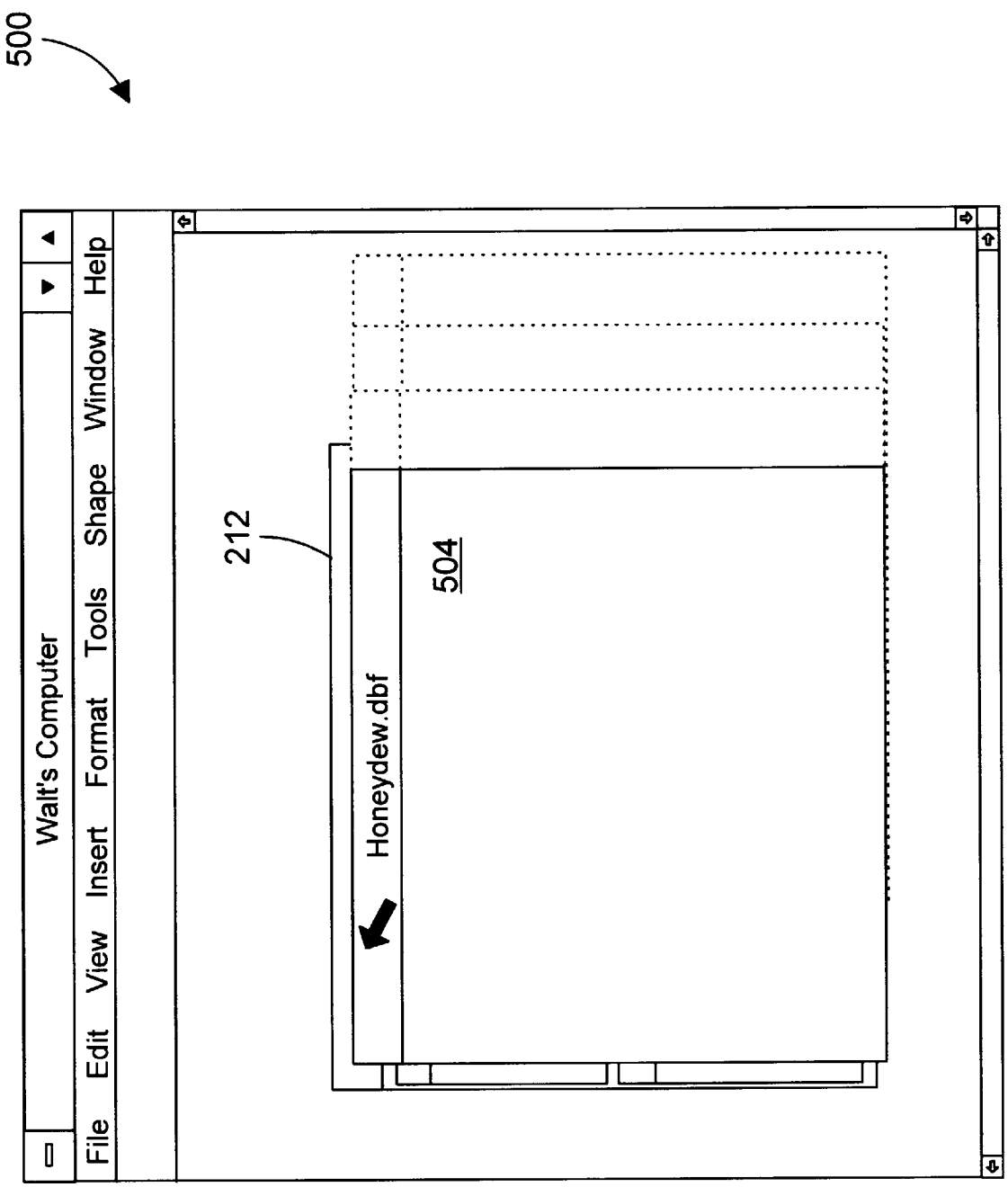
FIG. 11 shows the honeydew.dbf window as it crosses the right boundary of the dynamic window.

FIG. 11 depicts the honeydew.dbf window 504 as it is dragged into dynamic window 212. Dynamic window 212 already contains the watermelon.doc window 502 and the cantaloupe.spd window 506. The path of the honeydew.dbf window 504 as it is dragged into dynamic window 212 is shown in phantom which can be described as a leftward horizontal path. The initial location of the honeydew.dbf window 504 was to the right and just slightly downward from dynamic window 212 and the leftward horizontal dragging path causes the honeydew.dbf window 504 to be dragged over the right boundary of dynamic window 212.

Figure 12:
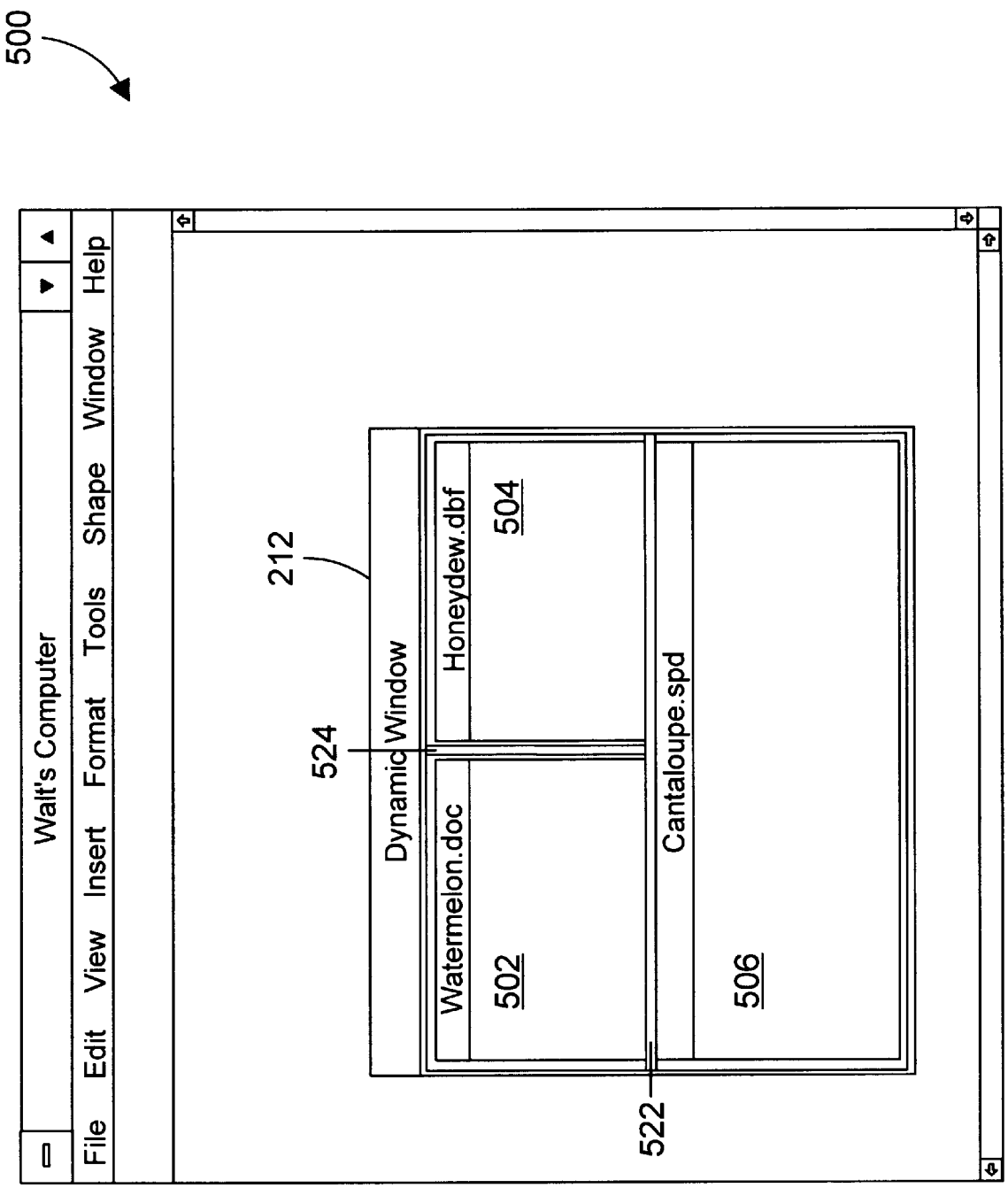
FIG. 12 illustrates the dynamic window after the honeydew.dbf window has been sized dynamically in proportion to the cantaloupe.spd window and the watermelon.doc window.

Referring now to FIG. 12, dynamic window 212 is shown containing the watermelon.doc window 502, the honeydew.dbf window 504 and the cantaloupe.spd window 506. As mentioned previously, any application window dropped into dynamic window 212 is dynamically sized in proportion to other windows already located within dynamic window 212. As shown in FIG. 10, the watermelon.doc window 502 and the cantaloupe.spd window 506 separated by the horizontal splitter 522 occupied dynamic window 212 before the honeydew.dbf window 504 was dropped into dynamic window 212. In FIG. 12, since the title bar of the honeydew.dbf window 504 crossed the right boundary of the dynamic window 212 above the horizontal splitter 522, the honeydew.dbf window 504 has been dynamically sized in proportion to the watermelon.doc window 502. If the title bar of the honeydew.dbf window 504 crossed the right boundary of dynamic window 212 below the horizontal splitter 522, the honeydew.dbf window would be placed to the right of the cantaloupe.spd window 506. If the honeydew.dbf window 504 crossed the right boundary of dynamic window 212 near the horizontal splitter 522, the honeydew.dbf window 504 would be placed to the right of both the watermelon.doc window 502 and the cantaloupe.spd window 506. In all cases, the crossing point of the right boundary 516 of dynamic window 212 is highlighted to provide a visual indication to the user of where the window being dropped into dynamic window 212 will be placed.

FIG. 12 also shows a vertical splitter 524 located between the watermelon.doc window 502 and the honeydew.dbf 504 window. As mentioned above, if the title bar of the application window crosses the top or bottom boundary of dynamic window 212, dynamic windowing mechanism 128 creates a horizontal splitter between the new application window and existing windows in dynamic window 212. Conversely, if the title bar of the application window crosses the left or right boundary of dynamic window 212, dynamic windowing mechanism 128 creates a vertical splitter. Here, dragging the honeydew.dbf window 504 into dynamic window 212 caused the title bar of the honeydew.dbf window 504 to cross the right boundary of dynamic window 212 causing vertical splitter 524 to be created between the watermelon.doc window 502 and the honeydew.dbf window 504.

Figure 13:
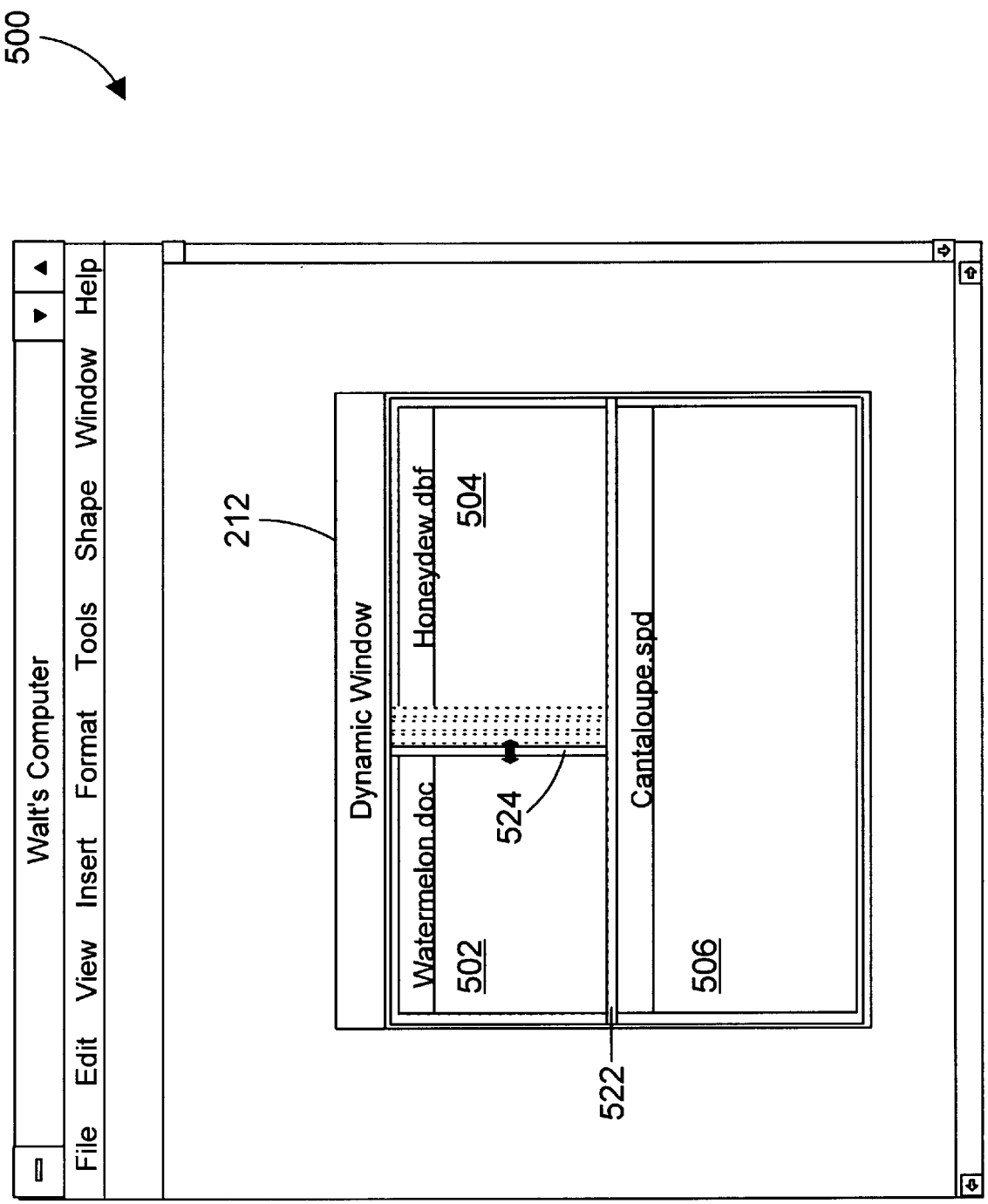
FIG. 13 depicts the adjustment of the vertical splitter located between the watermelon.doc window and the honeydew.dbf window.

FIG. 13 shows dynamic window 212 containing the watermelon.doc window 502, the honeydew.dbf window 504 and the cantaloupe.spd window 506. The horizontal splitter 522 separates the cantaloupe.spd window 506 from the watermelon.doc window 502 and the honeydew.dbf window 504. The vertical splitter 524 separates the watermelon.doc window 502 and the honeydew.dbf window 504.

The user may choose to alter the size of application windows residing within dynamic window 212 by adjusting the horizontal and vertical splitters created during dynamic sizing. According to the preferred embodiment, two methods may be used in order to adjust the splitters. In the first method, the user adjusts the size of the application windows by individually selecting and dragging the horizontal and vertical splitters. In the second method, the user adjusts the horizontal and vertical splitters simultaneously by selecting and dragging the intersection point (corners) of the splitters.

The first method of adjusting the size of the application window is shown in FIG. 13. The vertical splitter 524 located between the watermelon.doc window 502 and the honeydew.dbf 504 window has been selected and has been dragged in a path shown in phantom which may be described as a leftward horizontal path.

Figure 14:
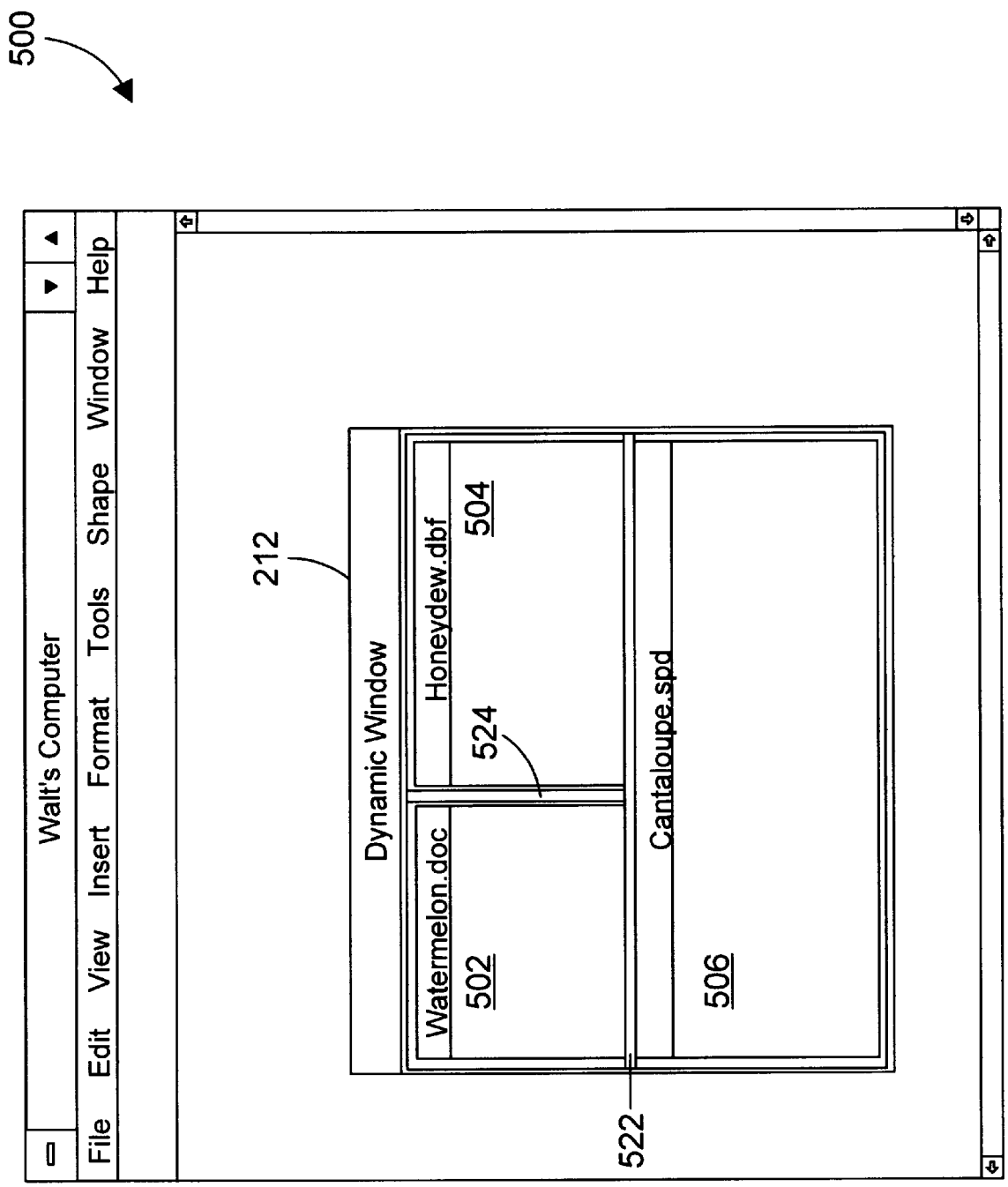
FIG. 14 depicts the dynamic window after the vertical splitter has been adjusted.

The result of selecting and dragging vertical splitter 524 located between the watermelon.doc 502 and the honeydew.dbf window 504 is shown in FIG. 14. The vertical splitter 524 is now positioned to the left of its original position as shown in FIG. 12. The repositioning of the splitter causes dynamic windowing mechanism 128 to resize application windows affected by the move. Here, since the original location of the splitter was between the watermelon.doc window 502 and the honeydew.dbf window 504, those application windows are no longer proportionately sized. The watermelon.doc window 502 is now smaller than the honeydew.dbf window 504.

Figure 15:
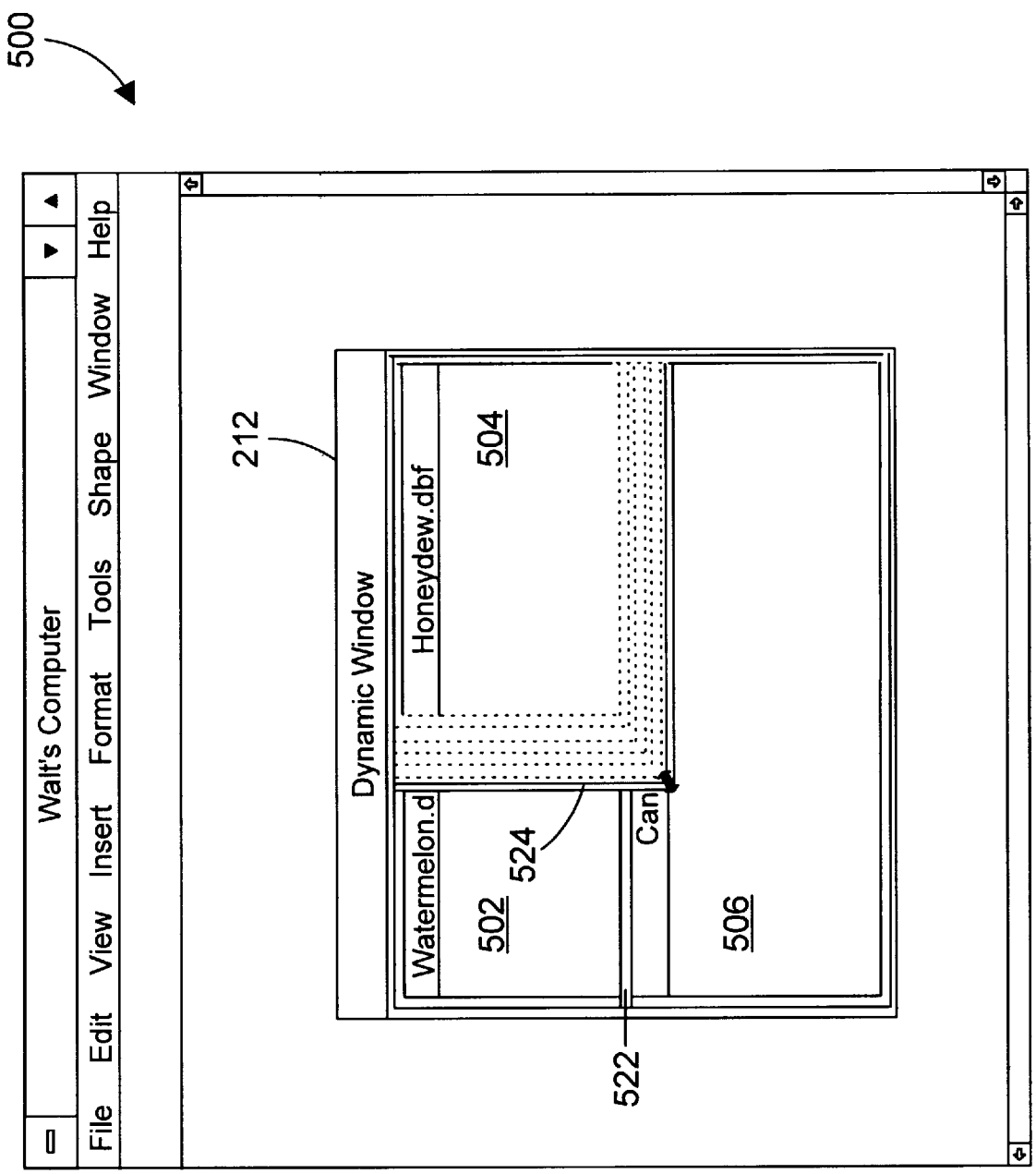
FIG. 15 depicts the simultaneous adjustment of the horizontal splitter and the vertical splitter.

The second method for adjusting the size of the application windows is shown in FIG. 15. Dynamic window 212 containing the watermelon.doc window 502, the honeydew.dbf window 504 and a partially obscured view of the cantaloupe.spd window 506 is shown. The position of a cursor 520 is over the intersection point between the vertical splitter 524 and the horizontal splitter 522 which have been selected and are being dragged simultaneously in a path shown in phantom which may be described as a downward diagonal path.

Figure 16:
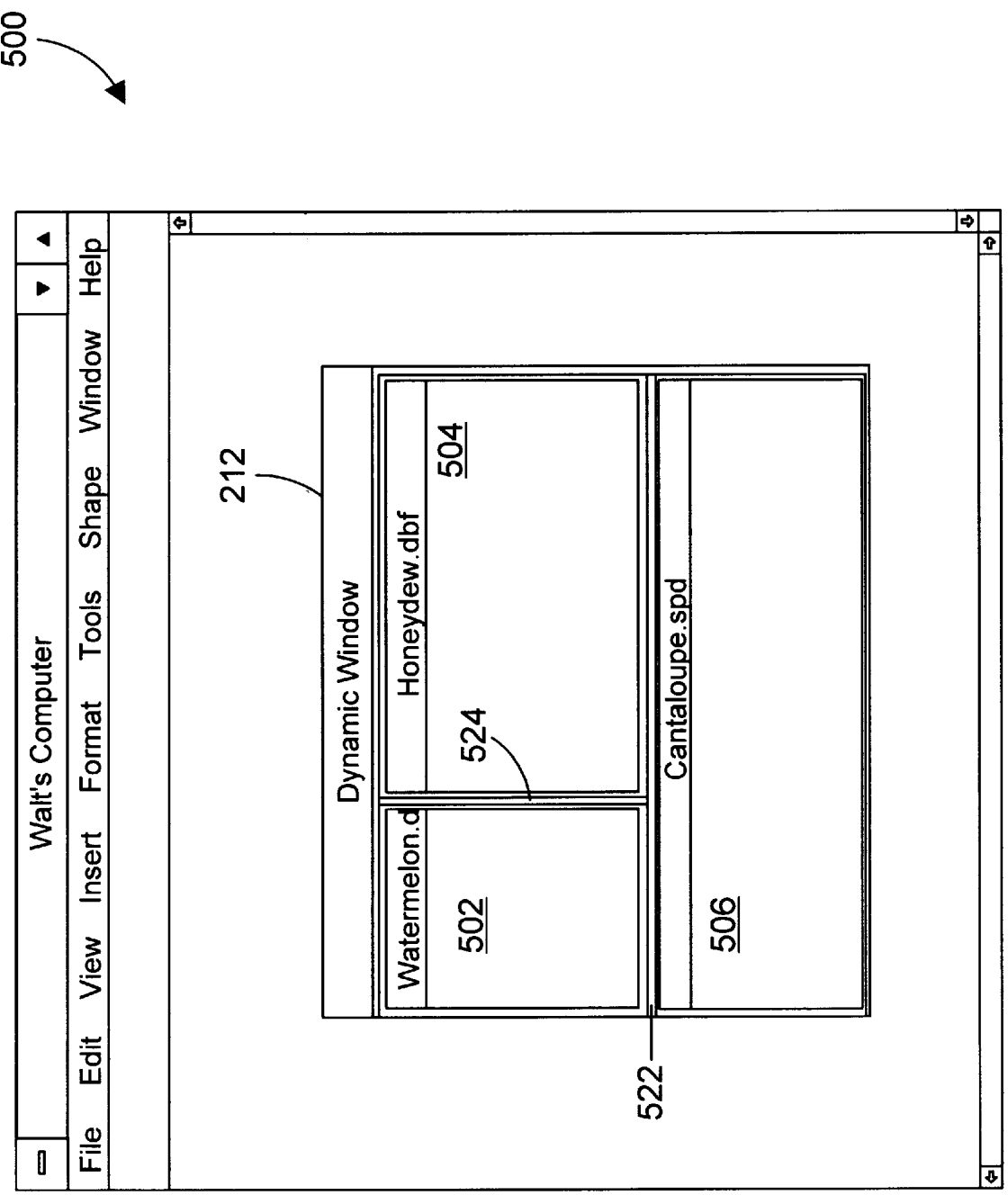
FIG. 16 shows the dynamic window after the horizontal splitter and the vertical splitter has been adjusted.

The result of dragging the horizontal and vertical splitters simultaneously is shown in FIG. 16. The vertical splitter 524 is now positioned to the left of its original position as shown in FIG. 14, and the horizontal splitter 522 is now positioned down from its original position also shown in FIG. 14. The honeydew.dbf window 504 is now larger, the watermelon.doc window 502 and the cantaloupe.spd window 506 are now smaller than their size before the adjustment of the vertical/horizontal splitters as shown in FIG. 14.

As a result of resizing windows displayed in dynamic window 212, it is possible to have windows become so small that they cannot display meaningful information. If this happens, dynamic windowing mechanism 128 creates a button to represent any application window which has become too small due to the positioning of the splitter within a predetermined distance of the boundary of dynamic window 212. Two different types of buttons may be created depending on whether the vertical or horizontal splitter has been repositioned.

Figure 17:
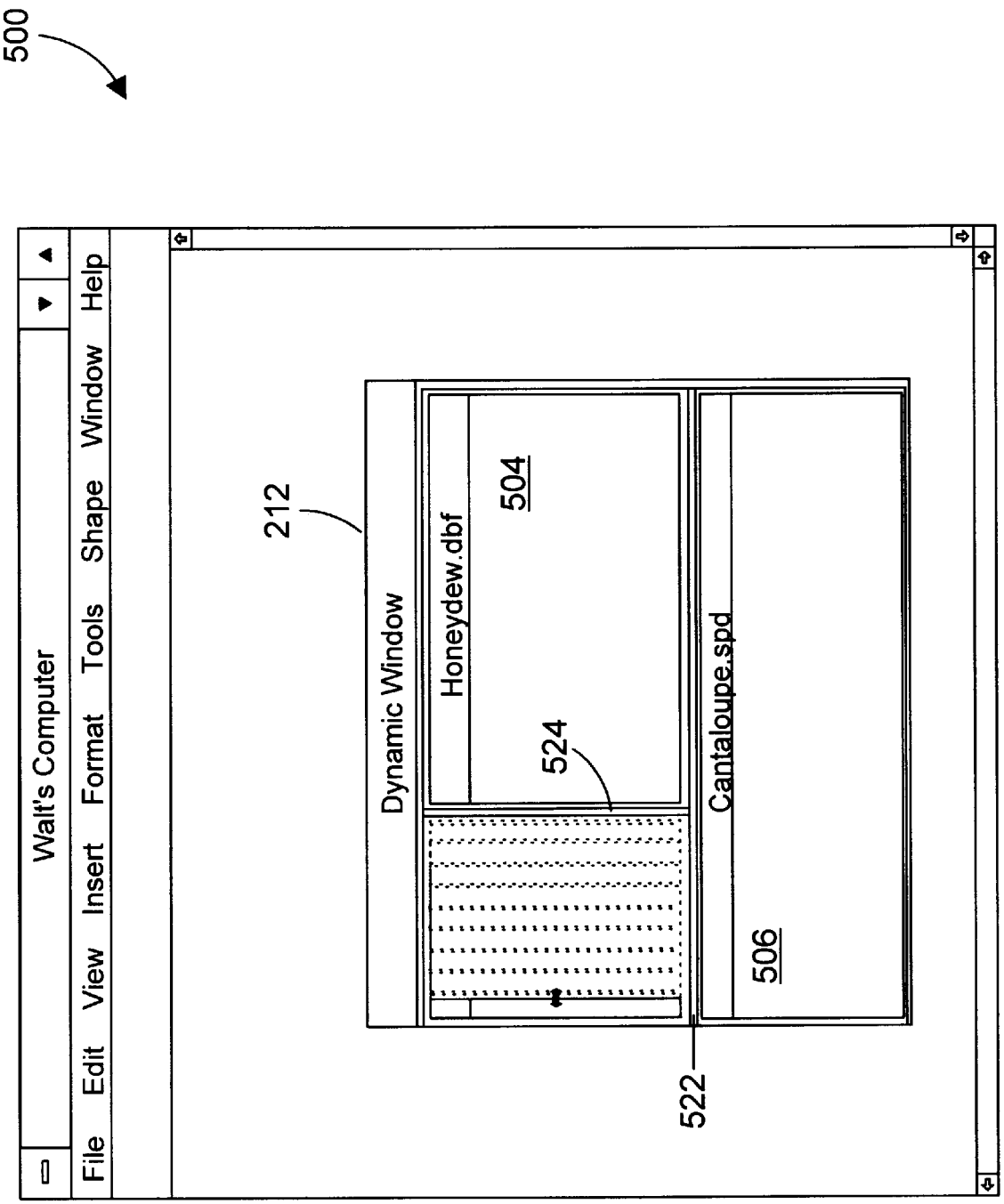
FIG. 17 depicts the vertical splitter as it is being dragged toward the left boundary of the dynamic window.
Figure 18:
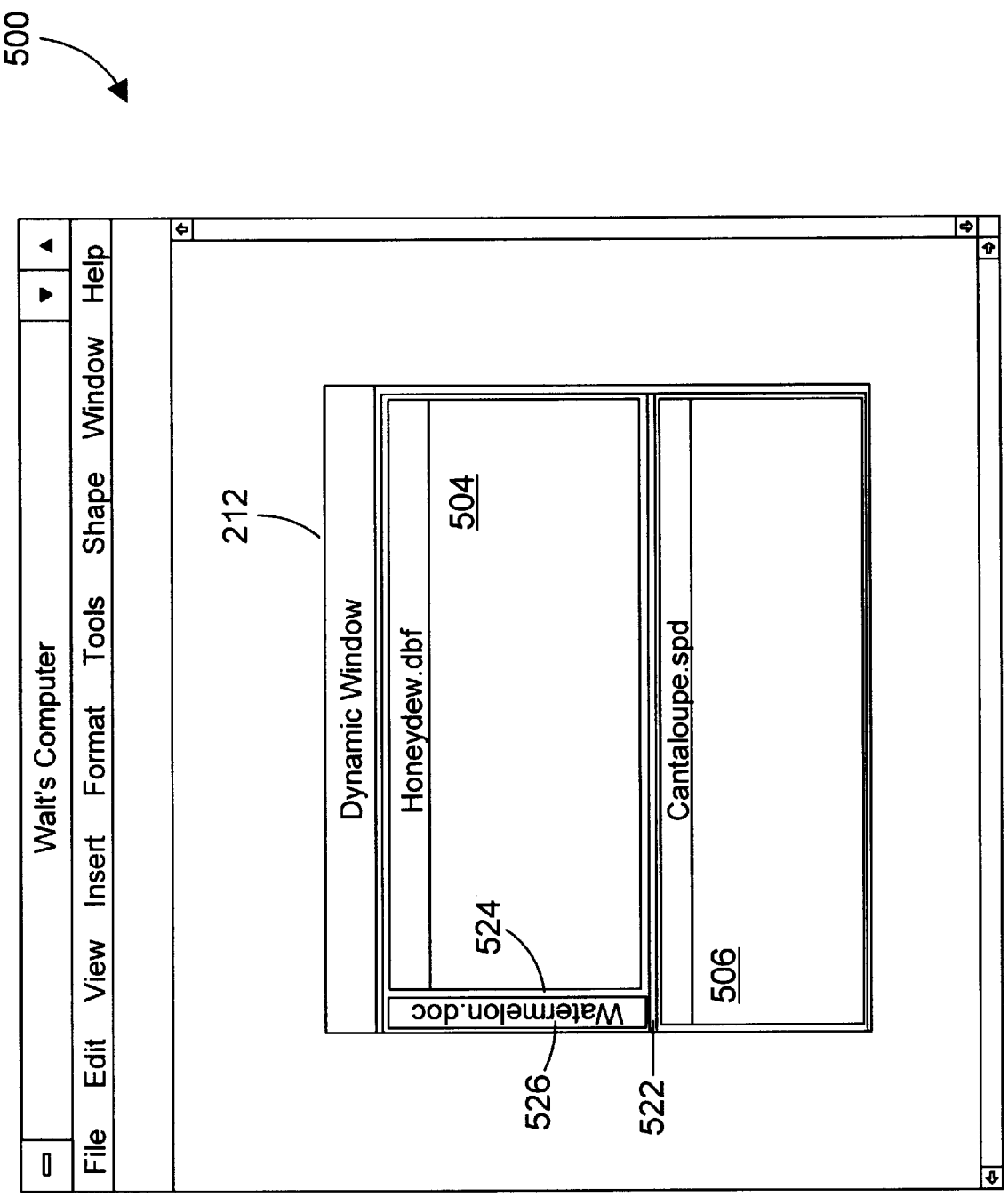
FIG. 18 depicts the button created from dragging the vertical splitter within a predetermined distance to the left boundary of the dynamic window.

The creation of a vertical button 526 to represent an application window is shown in FIGS. 17 and 18. Here, the vertical splitter 524 located between the honeydew.dbf window 504 and the watermelon.doc window 502 has been selected and has been dragged in a leftward horizontal path towards the left boundary of dynamic window 212. The size of the watermelon.doc window 502 is reduced as the splitter 524 is dragged towards the left boundary of dynamic window 212. Since the vertical splitter 524 has been dragged very close to the left boundary of dynamic window 212, the size of the watermelon.doc window 502 has been reduced to almost nothing.

The result of dragging the vertical splitter 524 within a predetermined distance of the left boundary of dynamic window 212 is shown in FIG. 18. Dragging the vertical splitter 524 close to the boundary of dynamic window 212 causes the size of the watermelon.doc window 502 to become too small. When an application window becomes too small by dragging the vertical splitter within a predetermined distance from the right or left boundary, dynamic windowing mechanism 128 creates a vertical button to represent the application window. Here, the dynamic windowing mechanism 128 created a button 526 shown in the upper left hand corner of dynamic window 212 to represent the watermelon.doe window 502. For this specific example, button 526 displays "watermelon.doc", the title of the window that has become too small to use.

Figure 19:
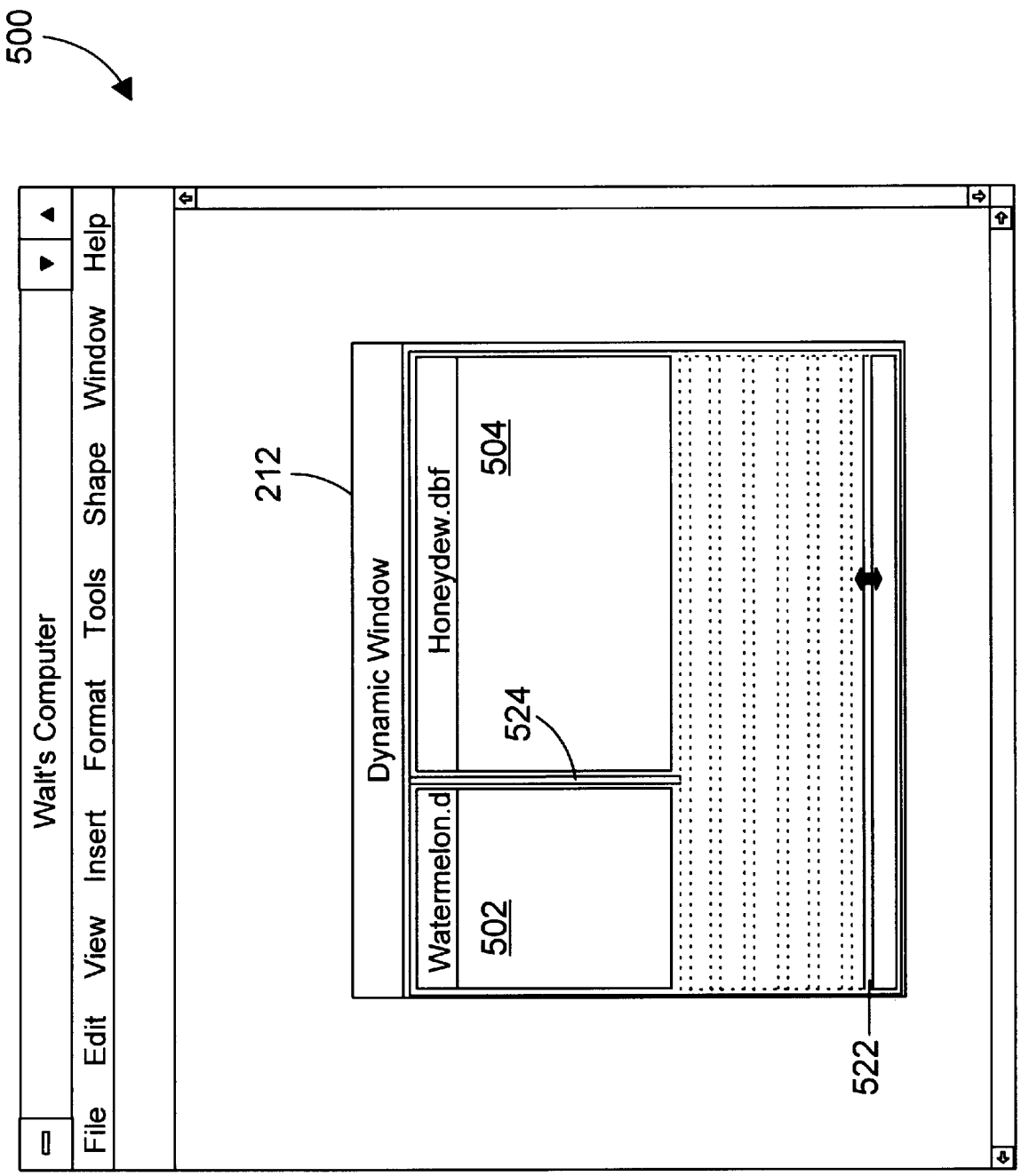
FIG. 19 illustrates the horizontal splitter as it is being dragged toward the bottom boundary of the dynamic window.
Figure 20:
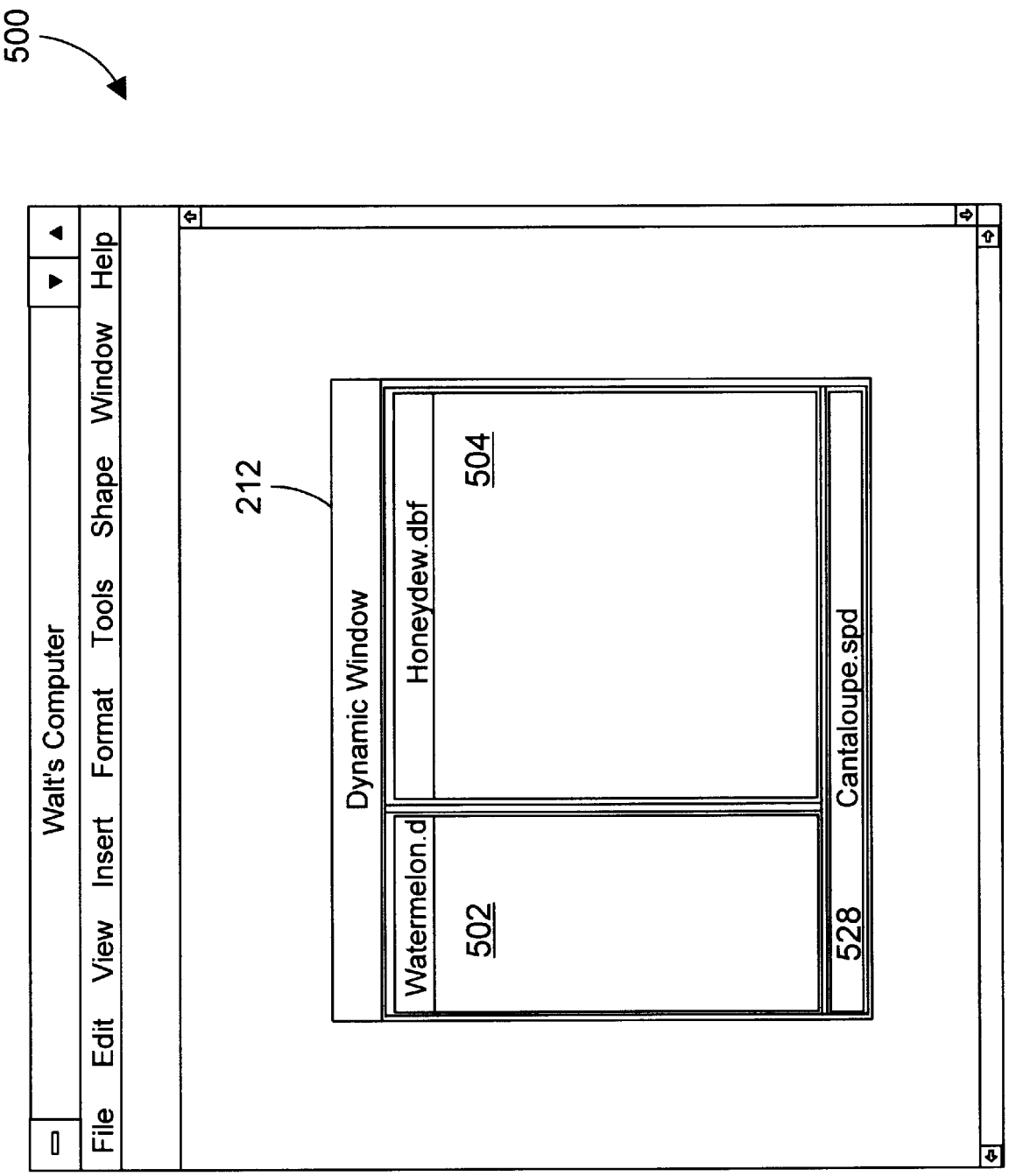
FIG. 20 shows the button created from dragging the horizontal splitter within a predetermined distance to the bottom boundary of the dynamic window.

The creation of a horizontal button 528 is demonstrated in FIGS. 19 and 20.

Here, the horizontal splitter 522 separating the cantaloupe.spd window 506 from the watermelon.doc window 502 and the honeydew.dbf window 504 has been selected and has been dragged in the path shown in phantom that can be described as a downward vertical path. Dragging the horizontal splitter 522 downwards towards the bottom boundary of dynamic window 212 causes the cantaloupe.spd window 506 to be reduced. Since the horizontal splitter 522 has been dragged very close to the bottom of dynamic window 212, the size of the cantaloupe.spd window 506 has been reduced to almost nothing.

The result of dragging the horizontal splitter 522 within a predetermined distance of the bottom boundary of dynamic window 212 is shown in FIG. 20. For this example, dynamic windowing mechanism 128 creates a horizontal button 528 shown at the bottom of dynamic window 212 order to represent the cantaloupe.spd window. Buttons created due to the dragging of the horizontal splitter display the title of the window. Here, the horizontal button 528 displays "cantaloupe.spd" to represent the window that corresponds to the button.

The user may return the horizontal or vertical splitter to its previous position by clicking on the button. Alternatively, the user can drag the adjacent splitter to resize the window to some other size instead.

The user may also remove any application window from dynamic window 212 by simply selecting, dragging and dropping the application window outside of dynamic window 212. In addition, dynamic windowing mechanism 128 allows the user to temporarily maximize one of the application windows located within dynamic window 212. When the maximized application window is returned to its previous size, the other windows in dynamic window 212 will also return to their previous sizes (before the one window was maximized).

The size of dynamic window 212 may be adjusted by the user by a variety of methods. The size of dynamic window 212 may be reduced or expanded in a horizontal direction by clicking and dragging a vertical border of dynamic window 212 to a new location. In similar fashion, the size of dynamic window 212 may be reduced or expanded in a vertical direction by clicking and dragging a horizontal border of dynamic window 212 to a new location. In addition, the size of dynamic window 212 may be reduced or expanded in both directions by clicking and dragging a corner of dynamic window 212 to a new location. Dynamic window 212 may be made to occupy the entire display by maximizing dynamic window 212, which causes the application windows to be enlarged to occupy the same proportion of the larger window that they occupied in the smaller window. Furthermore, dynamic window 212 may be minimized to a button, causing the name of dynamic window 212 to be displayed on the button.

While the invention has been particularly shown and described with reference to preferred exemplary embodiments thereof, it will be understood by those skilled in the art that various changes in form and details may be made therein without departing from the scope of the invention. For example, while the specific examples herein discuss displaying application windows within a dynamic window, the present invention extends to displaying any window within a dynamic window. This means that a use could put system windows (such as a desktop for an operating system) within a dynamic window. The scope of the present invention includes displaying any type of information within a window, whether the information is generated by the system (e.g., operation system), by an application, or by any other source of information.

I claim:

1. An apparatus comprising:
   at least one processor;
   a memory coupled to the at least one processor; and
   a dynamic windowing mechanism residing in the memory and executed by the at least one processor, the dynamic windowing mechanism automatically sizing, positioning and displaying without overlap a plurality of windows that are placed within a dynamic window, wherein the dynamic windowing mechanism automatically and dynamically sizes the plurality of windows placed within the dynamic window according to other of the plurality of windows, if any, already located within the dynamic window to substantially fill the dynamic window with the plurality of windows, wherein the dynamic windowing mechanism positions each of the plurality of windows in the dynamic window at a location within the dynamic window that is determined by which boundary of the dynamic window is crossed when placing each window into the dynamic window.

2. The apparatus of claim 1 wherein the dynamic windowing mechanism creates a horizontal splitter to separate two of the plurality of windows that are placed one above the other within the dynamic window, the horizontal splitter providing a mechanism for simultaneously changing height of each of the two windows by moving the horizontal splitter up and down.

3. The apparatus of claim 2 wherein the dynamic windowing mechanism creates a vertical splitter to separate two of the plurality of windows that are placed side by side within the dynamic window, the vertical splitter providing a mechanism for simultaneously changing width of each of the two windows by moving the vertical splitter left or right.

4. The apparatus of claim 3 wherein the dynamic windowing mechanism allows the location of the vertical splitter and the horizontal splitter to be adjusted simultaneously to re-size both horizontal and vertical dimensions of at least two of the plurality of windows in the dynamic window.

5. The apparatus of claim 2 wherein the dynamic windowing mechanism reduces at least one of the plurality of windows to a button when the horizontal splitter is dragged to an edge of the dynamic window.

6. The apparatus of claim 1 wherein the dynamic windowing mechanism creates a vertical splitter to separate two of the plurality of windows that are placed side by side within the dynamic window, the vertical splitter providing a mechanism for simultaneously changing width of each of the two windows by moving the vertical splitter left or right.

7. The apparatus of claim 6 wherein the dynamic windowing mechanism reduces at least one of the plurality of windows to a button when the vertical splitter is dragged to an edge of the dynamic window.

8. The apparatus of claim 1 wherein the dynamic windowing mechanism maximizes a selected one of the plurality of windows placed within the dynamic window such that the selected window substantially fills the dynamic window.

9. The apparatus of claim 8 wherein the dynamic windowing mechanism reduces the selected window back to its original size within the dynamic window.

10. An apparatus comprising:
at least one processor;
a memory coupled to the at least one processor;
a display coupled to the at least one processor, the display being capable of displaying a plurality of windows;
a dynamic windowing mechanism residing in the memory and executed by the at least one processor for displaying a dynamic window on the display, the dynamic window having a top boundary, a bottom boundary, a left boundary, and a right boundary, the dynamic windowing mechanism automatically sizing, positioning and displaying without overlap at least one of the plurality of windows that are placed within the dynamic window, the dynamic windowing mechanism including:
a mechanism for creating a vertical splitter when one of the plurality of windows is dragged into the dynamic window across the left or right boundary of the dynamic window when another of the plurality of windows is already in the dynamic window and for placing the dragged window at a location within the dynamic window that is determined by which of the left and right boundaries crossed when dragging the dragged window into the dynamic window;
a mechanism for creating a horizontal splitter when one of the plurality of windows is dragged into the dynamic window across the top or bottom boundary of the dynamic window when another of the plurality of windows is already in the dynamic window and for placing the dragged window at a location within the dynamic window that is determined by which of the top and bottom boundaries is crossed when dragging the dragged window into the dynamic window;
a mechanism for altering the horizontal and vertical dimensions of the at least one window placed within the dynamic window;
a mechanism for minimizing at least one window within the dynamic window into a button within the dynamic window; and
a mechanism for maximizing at least one window within the dynamic window to substantially fill the dynamic window and for returning the maximized window to its previous size within the dynamic window.

11. A program product comprising:
(A) a dynamic windowing mechanism for automatically sizing, positioning and displaying without overlap at least one window that is placed within a dynamic window, wherein the dynamic windowing mechanism automatically and dynamically sizes the plurality of windows placed within the dynamic window according to other of the plurality of windows, if any, already located within the dynamic window to substantially fill the dynamic window with the plurality of windows, wherein the dynamic windowing mechanism positions each of the plurality of windows in the dynamic window at a location within the dynamic window that is determined by which boundary of the dynamic window is crossed when placing each window into dynamic window; and
(B) signal bearing media bearing the dynamic windowing mechanism.

12. The program product of claim 11 wherein the signal bearing media comprises recordable media.

13. The program product of claim 11 wherein the signal bearing media comprises transmission media.

14. The program product of claim 11 wherein the dynamic windowing mechanism comprises:
a mechanism for creating a horizontal splitter when at least one window is dragged into the dynamic window across one of top and bottom boundaries of the dynamic window when a window already exists in the dynamic window.

15. The program product of claim 11 wherein the dynamic windowing mechanism comprises:
a mechanism for creating a vertical splitter when at least one window is dragged into the dynamic window across one of left and right boundaries of the dynamic window when a window already exists in the dynamic window.

16. The program product of claim 11 wherein the dynamic windowing mechanism comprises:
a mechanism for simultaneously altering the horizontal and vertical dimensions of at least one window in the dynamic window.

17. The program product of claim 11 wherein the dynamic windowing mechanism comprises:
a mechanism for minimizing at least one window in the dynamic window into a button within the dynamic window.

18. The program product of claim 11 wherein the dynamic windowing mechanism comprises:
a mechanism for maximizing the at least one window within the dynamic window to substantially fill the dynamic window and for returning the maximized window to its previous size within the dynamic window.

19. A program product comprising:
(A) a dynamic windowing mechanism for automatically sizing, positioning and displaying without overlap at least one window that is placed within a dynamic window having a top boundary, a bottom boundary, a left boundary, and a right boundary, the dynamic windowing mechanism including:
a mechanism for creating a vertical splitter when at least one window has been dragged into the dynamic window across one of the left and right boundary of the dynamic window when a window already exists in the dynamic window and for placing the dragged window at a location within the dynamic window the is determined by which of the left and right boundaries is crossed when dragging the dragged window into the dynamic window;
a mechanism for creating a horizontal splitter when at least one window has been dragged into the dynamic window across a top or bottom boundary of the dynamic window when a window already exists in the dynamic window and for placing the dragged window at a location within the dynamic window that is determined by which of the top and bottom boundaries is crossed when dragging the dragged window into the dynamic window;
a mechanism for simultaneously altering the horizontal and vertical dimensions of the at least one window in the dynamic window;
a mechanism for minimizing the at least one window in the dynamic window into a button within the dynamic window;
a mechanism for maximizing the at least one window within the dynamic window to substantially fill the dynamic window and for returning the maximized window to its previous size within the dynamic window; and
(B) signal bearing media bearing the dynamic windowing mechanism.

20. The program product of claim 19 wherein the signal bearing media comprises recordable media.

21. The program product of claim 19 wherein the signal bearing media comprises transmission media.

22. A method for displaying a plurality of windows within a dynamic window, the method comprising the steps of:
displaying the plurality of windows;
displaying the dynamic window;
selecting at least one of the plurality of windows and placing the selected window in the dynamic window;
automatically sizing, positioning and displaying without overlap all windows, including the selected window, that are placed within the dynamic window to substantially fill the dynamic window, the position of each of the plurality of windows within the dynamic window depending on which boundary of the dynamic window is crossed when placing each window within the dynamic window.

23. The method of claim 22 wherein the step of automatically sizing, positioning and displaying without overlap all windows that are placed within the dynamic window includes the step of:
creating a vertical splitter when at least one window has been dragged into the dynamic window across one of left and right boundaries of the dynamic window when a window already exists in the dynamic window.

24. The method of claim 22 wherein the step of automatically sizing, positioning and displaying without overlap all windows that are placed within the dynamic window includes the step of:
creating a horizontal splitter when at least one window has been dragged into the dynamic window across one of top and bottom boundaries of the dynamic window when a window already exists in the dynamic window.

25. The method of claim 22 wherein the step of automatically sizing, positioning and displaying without overlap all windows that are placed within the dynamic window includes the step of:
altering both the horizontal and vertical dimensions of the at least one window.

26. The method of claim 22 wherein the step of automatically sizing, positioning and displaying without overlap all windows that are placed within the dynamic window includes the step of:
minimizing the at least one window into a button within the dynamic window.

27. The method of claim 22 wherein the step of automatically sizing, positioning and displaying without overlap all windows that are placed within the dynamic window includes the step of:
allowing a user to simultaneously alter the horizontal and vertical dimensions of the at least one window.

28. The method of claim 22 wherein the step of automatically sizing, positioning and displaying without overlap all windows that are placed within the dynamic window includes the step of:
allowing a user to minimize at least one window into a button within the dynamic window.

29. The method of claim 22 wherein the step of automatically sizing, positioning and displaying without overlap all windows that are placed within the dynamic window includes the steps of:
maximizing the at least one window within the dynamic window to substantially fill the dynamic window; and
returning the maximized window to its previous size within the dynamic window.

30. A computer-implemented method for arranging a plurality of windows within a dynamic window, the method comprising the steps of:
(A) displaying the plurality of windows;
(B) displaying the dynamic window, the dynamic window having a top boundary, a bottom boundary, a left boundary, and a right boundary;
(C) selecting a first of the plurality of windows from outside the dynamic window;
(D) placing the first window into the dynamic window;
(E) dynamically sizing and positioning the first window within the dynamic window;
(F) selecting a second of the plurality of windows from outside the dynamic window;
(G) dragging the second window into the dynamic window;

(H) dynamically sizing and positioning the first and second windows within the dynamic window based on which boundary of the dynamic window is crossed when the second window is dragged into the dynamic window;

(I) creating a vertical splitter between the first and second window if the second window was dragged into the dynamic window across one of the left and right boundaries of the dynamic window;

(J) creating a horizontal splitter between the first and second window if the second window was dragged into the dynamic window across one of the top and bottom boundaries of the dynamic window;

(K) displaying the first and second windows in the dynamic window;

(L) allowing a user to alter the horizontal and vertical dimensions of the at least one window;

(M) allowing a user to minimize at least one window into a button within the dynamic window; and (N) allowing a user to maximize the at least one window within the dynamic window to substantially fill the dynamic window and to return the maximized window to its previous size within the dynamic window.

* * * * *

UNITED STATES PATENT AND TRADEMARK OFFICE
CERTIFICATE OF CORRECTION

PATENT NO. : 6,008,809
DATED : December 28, 1999
INVENTOR(S) : Arthur P. Brooks

It is certified that error appears in the above-identified patent and that said Letters Patent is hereby corrected as shown below:

Claim 10, Column 14, Line 3: "boundaries crossed" should be
--boundaries is crossed--, Claim 11 Column 14, Line 40: "into dynamic" should be
--into the dynamic--, Claim 19, Column 15, Line 25: "window the" should be
--window that--.

Signed and Sealed this

Twenty-fourth Day of October, 2000

Q. TODD DICKINSON

*Attest:*

*Attesting Officer*  *Director of Patents and Trademarks*